(12) United States Patent
Levitt et al.

(10) Patent No.: US 8,201,697 B2
(45) Date of Patent: *Jun. 19, 2012

(54) HYDROCLONE BASED FLUID FILTRATION SYSTEM

(75) Inventors: David J. Levitt, San Anselmo, CA (US); Frank Dutro, Saratoga, CA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/019,114

(22) Filed: Feb. 1, 2011

(65) Prior Publication Data

US 2011/0120959 A1    May 26, 2011

Related U.S. Application Data

(63) Continuation of application No. 11/506,374, filed on Aug. 18, 2006, now Pat. No. 7,896,169.

(60) Provisional application No. 60/709,868, filed on Aug. 18, 2005, provisional application No. 60/822,486, filed on Aug. 15, 2006.

(51) Int. Cl.
*B01D 21/26* (2006.01)

(52) U.S. Cl. ............... 210/512.1; 210/791; 210/805; 210/806; 210/304; 209/12.1; 209/725

(58) Field of Classification Search ............ 210/512.1, 210/512.2, 787, 788, 791, 805, 806, 304, 210/484, 485; 209/12.1, 722, 725; 55/459.1, 55/370

See application file for complete search history.

(56) References Cited

U.S. PATENT DOCUMENTS 1,107,485 A    8/1914    Bowser (Continued)

FOREIGN PATENT DOCUMENTS

EP    0375671    6/1990

(Continued)

OTHER PUBLICATIONS

International Search Report dated Dec. 14, 2006, from corresponding PCT Application No. PCT/US06/32457.

(Continued)

*Primary Examiner* — Tony G Soohoo
*Assistant Examiner* — David C Mellon
(74) *Attorney, Agent, or Firm* — Edward W. Black

(57) ABSTRACT

A variety of improved hydroclone based fluid filtering systems are described. The hydroclones generally include a tank having an internal chamber and a filter (preferably a surface filter) that is positioned within the internal chamber. The filter defines a filtered fluid chamber within the internal chamber of the tank. The hydroclone may be operated such that a vortex of flowing fluid is formed between the chamber wall and the filter with the filter being located in the center of the vortex. With this arrangement, the filter acts as a cross-flow filter. In one aspect of the invention, the filter is a stepped filter. In another aspect of the invention, the filter is an surface filter, as for example, an electroformed metal surface filter. In some preferred embodiments, the openings in the filter are arranged as slots that extend substantially vertically so that they are oriented substantially perpendicular to the flow path of fluid flowing in the adjacent portion of the vortex. In another aspect of the invention, a circulating cleaning assembly is provided in the hydroclone region. The cleaning assembly is arranged to help clean the filter and is driven by the vortex of flowing fluid formed in the hydroclone region of the internal chamber. In yet another aspect of the invention, improved hydroclone intake structures are described. The described hydroclones may be used to filter water and other fluids in a wide variety of applications.

32 Claims, 15 Drawing Sheets

U.S. PATENT DOCUMENTS

| | | | |
|---|---|---|---|
| 1,919,653 A | 7/1933 | Hill | |
| 2,788,087 A | 4/1957 | Lenehan | |
| 2,917,173 A | 12/1959 | Rakowsky | |
| 3,061,098 A | 10/1962 | Brezinski | |
| 3,219,186 A | 11/1965 | Polhemus et al. | |
| 3,285,422 A | 11/1966 | Wiley | |
| 3,529,724 A | 9/1970 | Maciula et al. | |
| 4,120,783 A | 10/1978 | Baummer | |
| 4,146,468 A | 3/1979 | Wilson | |
| 4,159,073 A | 6/1979 | Liller | |
| 4,178,258 A | 12/1979 | Papay et al. | |
| 4,216,095 A | 8/1980 | Ruff | |
| 4,298,465 A | 11/1981 | Druffel | |
| 4,414,112 A | 11/1983 | Simpson et al. | |
| 4,575,406 A * | 3/1986 | Slafer | 210/500.25 |
| 4,651,540 A * | 3/1987 | Morse | 62/503 |
| 4,698,156 A | 10/1987 | Bumpers | |
| 5,104,520 A | 4/1992 | Maronde et al. | |
| 5,116,516 A | 5/1992 | Smisson | |
| 5,188,238 A | 2/1993 | Smisson et al. | |
| 5,227,061 A * | 7/1993 | Bedsole | 210/304 |
| 5,407,584 A | 4/1995 | Broussard, Sr. | |
| 5,478,484 A | 12/1995 | Michaluk | |
| 5,593,043 A * | 1/1997 | Ozmerih | 209/303 |
| 5,879,545 A | 3/1999 | Antoun | |
| 5,972,215 A | 10/1999 | Kammel | |
| 6,117,340 A | 9/2000 | Carstens | |
| 6,238,579 B1 | 5/2001 | Paxton et al. | |
| 6,896,720 B1 | 5/2005 | Arnold et al. | |
| 7,166,230 B2 | 1/2007 | Nilsen et al. | |
| 7,632,416 B2 | 12/2009 | Levitt | |
| 7,785,479 B1 | 8/2010 | Hosford | |
| 2003/0029790 A1 | 2/2003 | Templeton | |
| 2003/0221996 A1 | 12/2003 | Svoronos et al. | |
| 2007/0045168 A1 | 3/2007 | Levitt et al. | |
| 2007/0075001 A1 | 4/2007 | Knol | |
| 2011/0220586 A1 | 9/2011 | Levitt | |

FOREIGN PATENT DOCUMENTS

| | | |
|---|---|---|
| EP | 0566792 | 10/1993 |
| FR | 2791904 | 10/2000 |
| GB | 2423264 | 8/2006 |
| KR | 10-0899416 | 5/2009 |
| WO | 03026832 | 4/2003 |
| WO | 2004064978 | 8/2004 |

OTHER PUBLICATIONS

Written Opinion dated Dec. 14, 2006, from corresponding PCT Application No. PCT/US06/32457.

DOW Water & Process Solutions, G. Onifer, Oct. 2010, Executive Summary: Clean Filtration Technologies, Inc Turboclone Filter, pp. 1-3.

Clean Filtration Technologies, Inc. CFT Turboclone Demo System, 2010, pp. 1-2.

Clean Filtration Technologies, Inc. CFT Turboclone TC-201 Technical Datasheet, 2010, pp. 1.

* cited by examiner

HYDROCLONE BASED FLUID FILTRATION SYSTEM

This application is a Continuation of U.S. application Ser. No. 11/506,374 filed Aug. 18, 2006 (now U.S. Pat. No. 7,896, 169), which claims priority of U.S. Provisional Application No. 60/709,868 filed Aug. 18, 2005, and U.S. Provisional Application No. 60/822,486 filed Aug. 15, 2006, both of which are incorporated herein by reference.

BACKGROUND OF THE INVENTION

The present invention generally relates to fluid filtering. More particularly, the invention relates to hydroclone based fluid filtration systems with cross flow filters. The described devices may be used in a variety of water treatment, fluid filtering and particle separation applications.

A wide range of technologies are currently used to treat, purify and/or filter water. Many such technologies require a relatively large amount of physical space and/or require the use of consumable filters that add to operational costs. For example, many drinking water treatment applications utilize settling ponds in combination with a series of screens and filters of progressively decreasing pore size to remove suspended solid particles from water.

In other applications cyclonic separators or hydroclones have been used to separate suspended particles from water and other fluid mediums. Hydroclones operate by introducing water into a conically shaped chamber to create a vortex within the chamber. Generally, the influent water is introduced near the top of a conical chamber and an effluent stream is discharged near the bottom of the chamber. Centrifugal force tends to cause heavier particles to move towards the periphery of the vortex. As a result the water near the center of the vortex tends to be cleaner than water at the periphery of the vortex. Thus, relatively cleaner water can be drawn from a central region of the hydroclone. By way of example, U.S. Pat. Nos. 3,529,724; 5,407,584, 5,478,484, and 5,879,545 all describe various hydroclone designs.

Although hydroclones have been used to remove suspended particles from water in a variety of applications, existing hydroclones are generally not well suited for filtering applications that require the removal of relatively small sized particles from large volumes of water. Therefore, hydroclones are typically not used to pre-filter drinking water or in a wide variety of other applications due to limitations in their filtering ability.

Although existing water filtering systems and existing hydroclones work well for their intended uses, there are continuing efforts to provide improved and/or more cost effective purification and/or filtering devices that can meet the needs of various specific applications.

SUMMARY OF THE INVENTION

In order to achieve the foregoing and other objects of the invention, a variety of improved hydroclone based fluid filtering systems are described. The hydroclones generally include a tank having an internal chamber. The tank includes a tapered (generally frusto-conically shaped) working section, a fluid inlet, a filtered fluid outlet and an effluent outlet. The diameter of the internal chamber is larger near the fluid inlet than at the effluent outlet. A filter (which is preferably a surface filter) is positioned within the internal chamber of the tank. The filter defines a filtered fluid chamber within the internal chamber. The fluid inlet is arranged such that fluid entering the chamber flows into a region between the chamber wall and the filter. The filtered fluid outlet is arranged to discharge filtered fluid from the filtered fluid chamber. The effluent outlet is arranged to discharge a concentrated effluent that has generally not passed through the filter. The hydroclone may be operated such that a vortex of flowing fluid is formed between the chamber wall and the filter with the filter being located in the center of the vortex. With this arrangement, the filter acts as a cross-flow filter. The region between the chamber wall and the filter that supports the vortex is generally referred to herein as the hydroclone region or chamber.

In one aspect of the invention, the filter has a plurality of steps each having a different diameter. The largest diameter step is positioned so that it is closest to the fluid inlet and the smallest diameter step is located generally near the effluent outlet. These steps help reduce the incidence of eddies and countercurrents within the hydroclone chamber. In some embodiments, the filter is arranged as a plurality of substantially circular stages, each stage having a successively smaller diameter. In another embodiment, a single spiral step is provided. The stepped filter is preferably a surface filter.

In another aspect of the invention, the filter is a surface filter, as for example, an electroformed metal surface filter. In some preferred embodiments, the openings in the surface filter are arranged as slots that extend substantially vertically so that they are oriented substantially perpendicular to the flow path of fluid flowing in the adjacent portion of the vortex. The width of the slots may be varied to meet the needs of a particular filtering application. By way of example, slot widths in the range of 5 to 50 microns are particularly useful for a number of applications, although wider and narrower slots may be formed when appropriate for specific applications. The openings are also preferably tapered such that they are narrowest on the surface of the filter that faces the vortex and open wider towards the filtered fluid chamber. This arrangement helps reduce the probability of particles getting trapped within the filter as opposed to being blocked on the surface.

In still another aspect of the invention, a circulating cleaning assembly is provided in the hydroclone region. The cleaning assembly is arranged to help clean the filter and is driven by the vortex of flowing fluid formed in the hydroclone chamber. In some embodiments, the cleaning assembly includes a frame and a plurality of brushes carried by the frame. The brushes have filaments that are arranged to clean the filter as the cleaning assembly is rotated about the filter by the vortex. In embodiments that utilize a stepped filter, the brushes may optionally be stepped to match the steps in the filter. In some embodiments, the brushes are arranged to physically wipe the filter while in other embodiments, the brushes do not physically touch the filter but rather the push water across the surface of the filter. In other embodiments structures other than brushes may be used to clean the filter. For example, squeegees work well.

In some embodiments, the cleaning assembly may also include a plurality of rollers carried by the frame. The rollers are arranged to engage the chamber wall or the filter to guide the cleaning assembly as the cleaning assembly is rotated about the filter by the vortex. In others embodiments, skids or other suitable guide structures may be used in place of or in addition to the rollers.

In yet another aspect of the invention, improved hydroclone intake structures are described. Generally, the intake structure is arranged to introduce the influent stream tangentially into the fluid chamber. The intake structure includes a tapered section and a descending fluid ramp that gradually directs the influent stream downward in its first rotation within the fluid chamber. In some preferred embodiments, the fluid intake ramp descends in the range of 30-70 percent of the height of the influent stream.

In some embodiments, the intake structure has primary and secondary channels that together define the full width of the intake ramp. The primary channel is arranged to receive an influent stream that is narrower than the intake ramp. The primary channel has a tapered section that gradually widens to the full width of the intake ramp. The secondary channel is located adjacent the primary channel in the region between the fluid inlet and a convergence point where the width of the primary channel is the same as the width of the intake ramp. The intake ramp may be arranged to descend at a substantially constant rate from the convergence point to the fluid inlet and the secondary channel may be arranged to descend at the same constant rate as the intake ramp.

The described hydroclones may be used to filter water and other fluids in a wide variety of applications. They may also be used as concentrators that concentrate particles that are suspended in fluids.

BRIEF DESCRIPTION OF THE DRAWINGS

The invention, together with further objects and advantages thereof, may best be understood by reference to the following description taken in conjunction with the accompanying drawings in which.

The depictions in the figures are diagrammatic and not to scale.

DETAILED DESCRIPTION OF THE PREFERRED EMBODIMENTS

Figure 1:
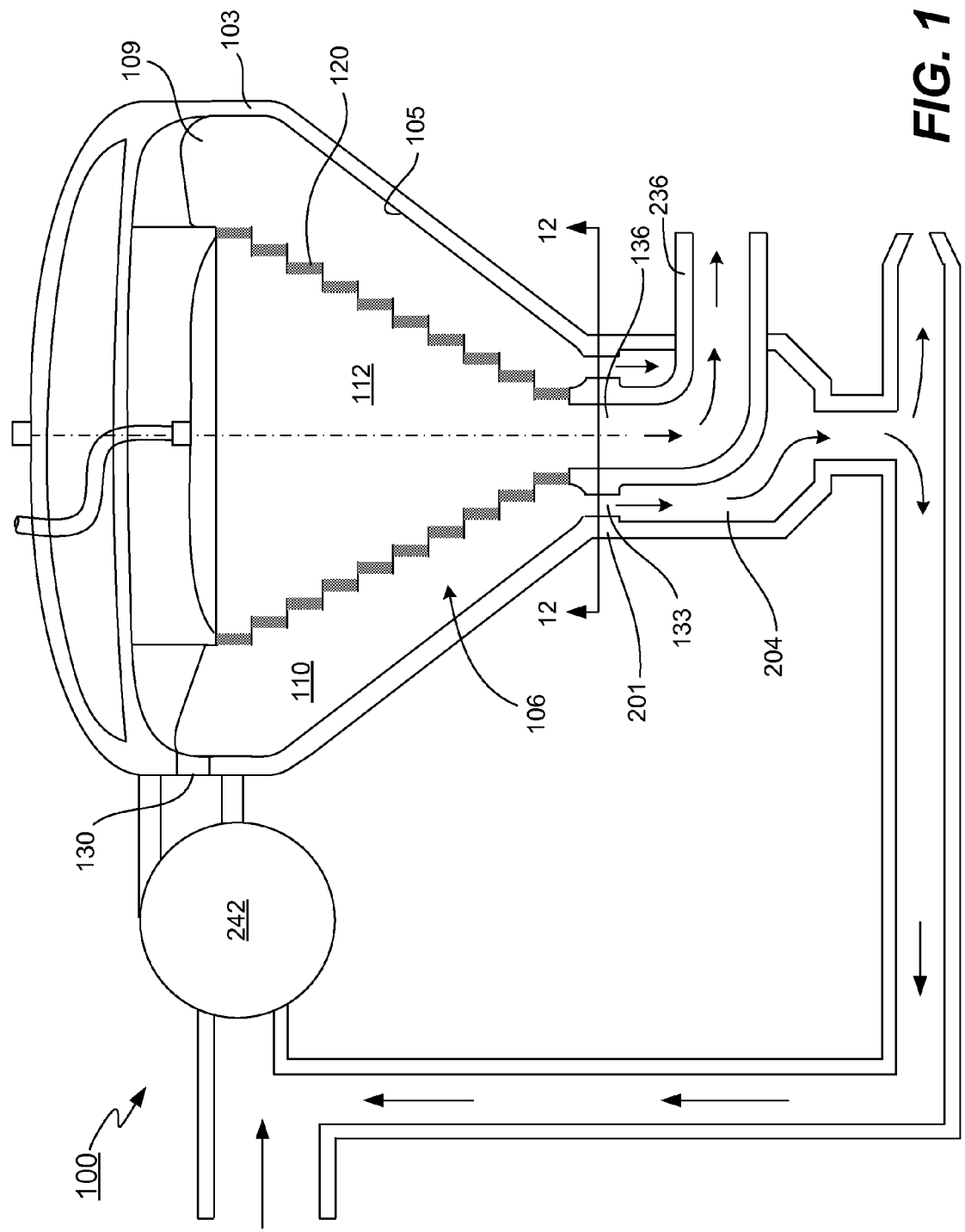
FIG. 1 is a functional schematic diagram of a hydroclone based filtering system in accordance with one embodiment of the present invention.
Figure 2:
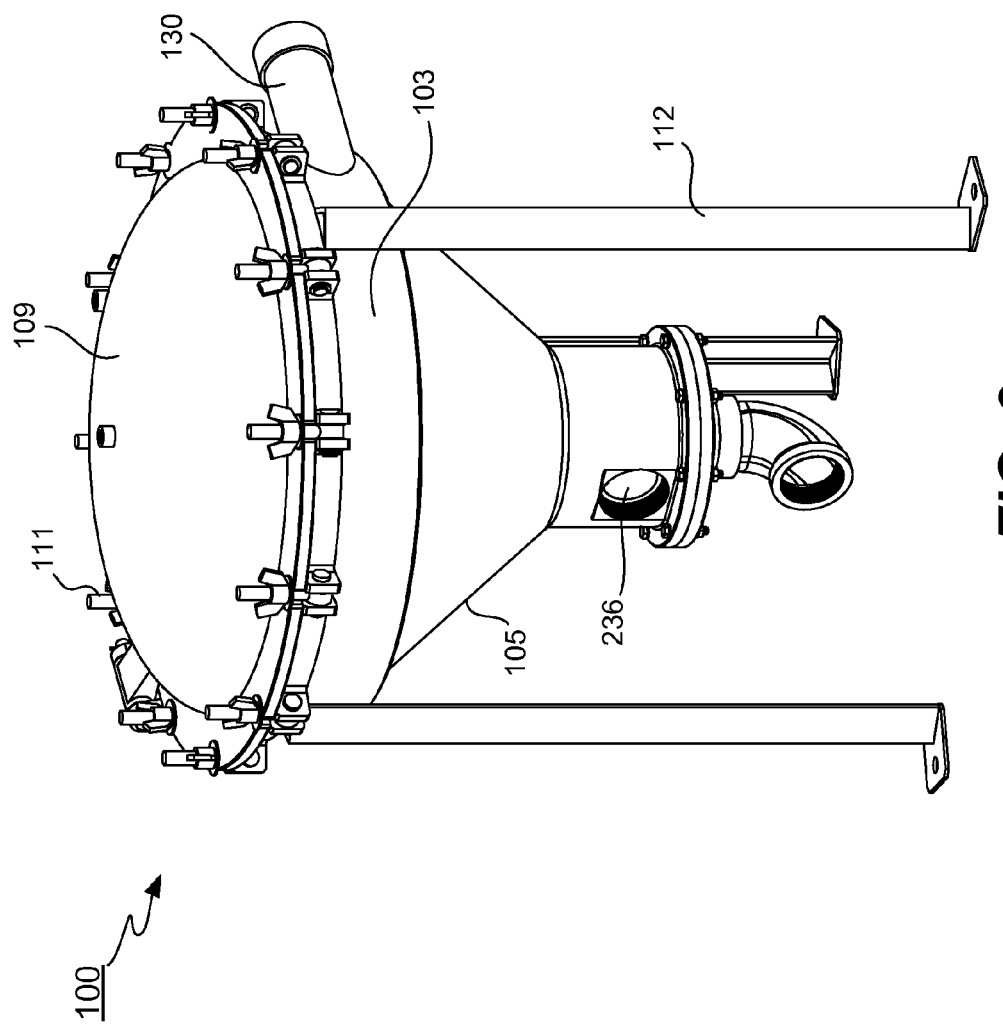
FIG. 2 is a diagrammatic external perspective view of a hydroclone based filtering system in accordance with another embodiment of the invention.
Figure 3:
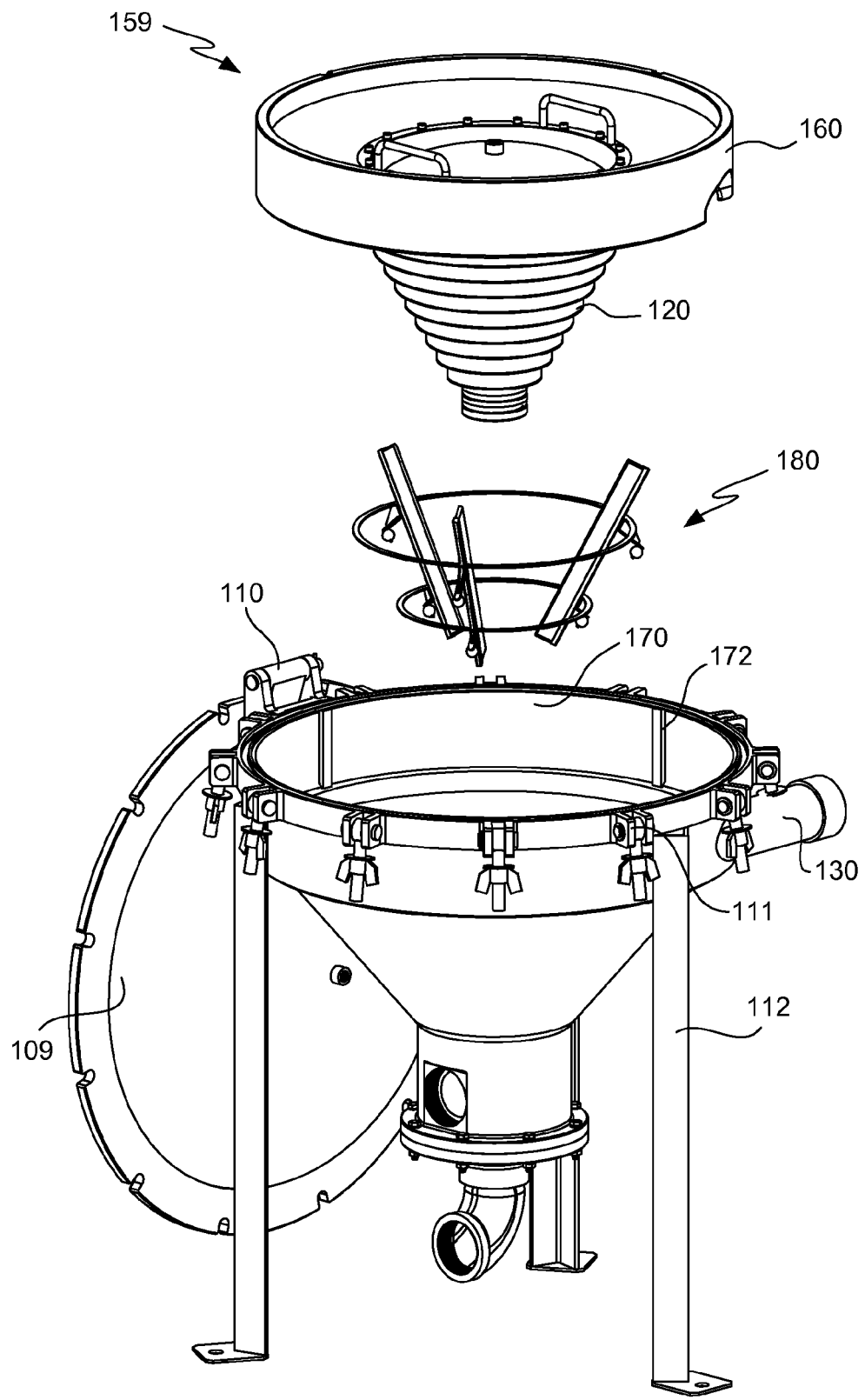
FIG. 3 is an exploded perspective view of the hydroclone based filtering system illustrated in FIG. 2.

A hydroclone based filtration system in accordance with one embodiment of the present invention is diagrammatically illustrated in FIGS. 1-3. As seen therein, the hydroclone based filtration system 100 includes a housing 103 having chamber walls 105 and a lid 109. The chamber walls 105 define a tapered (frusto-conically shaped) fluid compartment 106 and the lid 109 covers the fluid compartment 106. The housing 103 is supported by a stand 112 that can take any suitable form. A stepped filter assembly 120 is positioned within the fluid compartment 106. As will be described in more detail below, the stepped filter assembly 120 may be substantially conically (frusto-conically) shaped as well and is positioned centrally within the fluid compartment 106 so that the filter is spaced apart from the peripheral chamber walls 105. The region between the chamber walls 105 and the filter assembly 120 is defined as a hydroclone chamber 110 and the region in the central region of the filter is defined as a filtered fluid chamber 112.

Functionally, the hydroclone 100 has three main openings. The openings include a fluid inlet 130 located at the wide (upper) end of the hydroclone chamber 110, an effluent outlet 133 located at the narrow (bottom) end of the hydroclone chamber 110, and a filtered fluid outlet 136 from the filtered fluid chamber 112, which is located near the narrow (bottom) end of the fluid compartment 106. The fluid inlet 130 is preferably arranged such that fluid entering the hydroclone chamber 110 flows substantially tangentially into a region at the wide (top) end of the fluid compartment 106 between the chamber wall 105 and the stepped filter 120 and generally moves through the hydroclone chamber 110 in a forced vortex towards the effluent outlet 133 located at the narrow end of the hydroclone chamber. Some of the fluid entering the hydroclone chamber will pass through the filter assembly 120 into the filtered fluid chamber 112. Filtered fluid (e.g., clean water) exits the filtered fluid chamber through the filtered fluid outlet 136. Any fluid in the hydroclone that does not pass through the filter exits the hydroclone chamber 110 through the effluent outlet 133.

The filter assembly 120 is preferably a surface filter that is not designed to trap particles and therefore the filtering has the effect of increasing the concentration of particles in the effluent stream relative to the inlet fluid. As will be described in more detail below, the filtering characteristics of the described system can be varied significantly by controlling the relative flow rates of the effluent and filtered fluid outlets 133, 136. The concentrating characteristics of the system can be varied significantly by feeding at least some of the effluent stream back into the hydroclone and by controlling the relative rates and nature of such feedback.

There are a number of aspects of the illustrated hydroclone that make it work particularly well for water (and other fluid) filtering applications. Cyclone based separators are well known. Generally, they work on the principle that in the environment of a vortex, particles will tend to migrate towards the exterior of the vortex, while liquids tend to move towards the center of the vortex. With this arrangement, an effluent outlet near the bottom peripheral end of the separator can be used to remove the particles, while an outlet that draws from a central region of the separator can be used to remove the liquid. In a hydroclone based separator, the inlet fluid is water (or another suitable liquid) and the hydroclone may be used to concentrate particles in the effluent outlet stream while outputting relative clean water that is drawn from the center of the hydroclone. In the present invention, the insertion of the filter assembly 120 further assists the separation of the particles and other contaminants from the center region of the hydroclone and thus the clean water outlet discharges filtered water. The use of a central filter can be quite effective at improving the cleanliness of the discharged clean water.

A wide variety of filters can be used within the hydroclone and their physical size, geometry and pore size may all be widely varied. Although a wide variety of different filter designs may be used within the hydroclone a few specific filter designs that are particularly well adapted for use in the hydroclone are described below.

Generally, it is preferable to use a surface filter that blocks particles at the surface of the filter rather than a standard depth filter that collects particulates within the filter itself. As will be described in more detail below, the use of a surface filter facilitates self-cleaning and thus reduces the overall maintenance of the device since the surface filters do not need to be replaced as frequently as depth filters would typically need to be replaced.

It is also generally preferred that the filter be tapered with the wide end of the filter being located at the wide end of the fluid compartment 106 and the narrow end of the filter being located near the narrow end of the fluid compartment.

Figure 9:
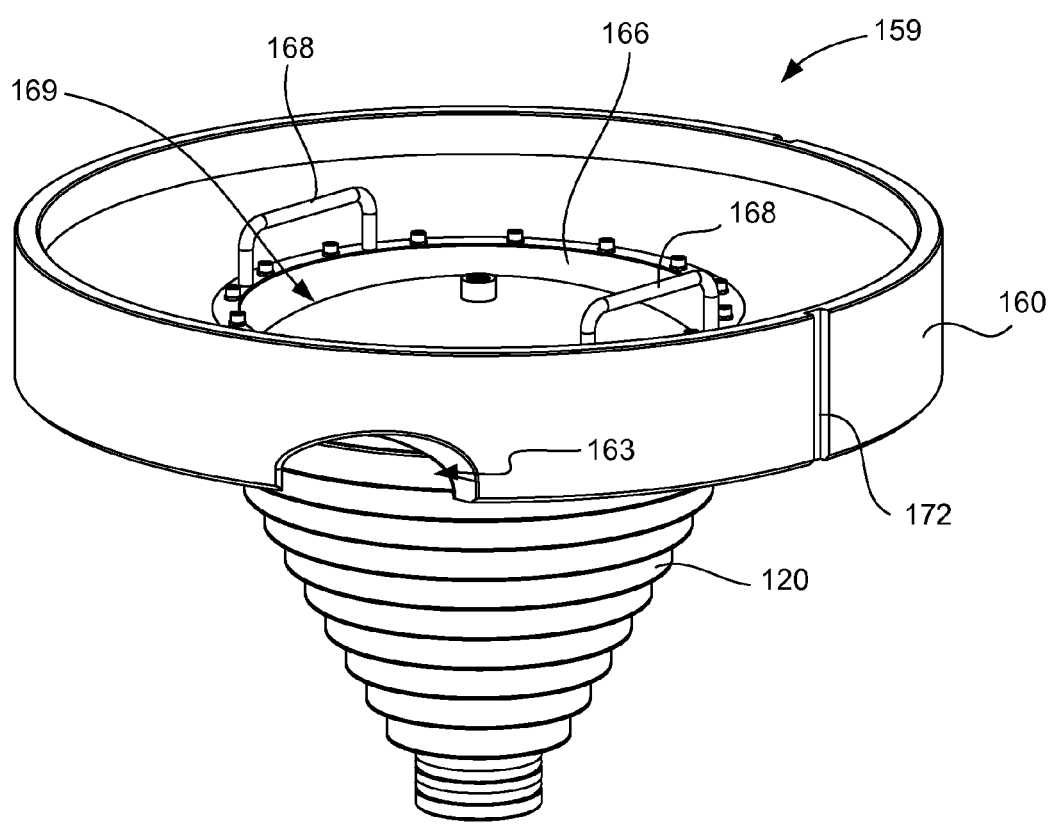
FIG. 9 is a diagrammatic side view of a filter cartridge in accordance with another embodiment of the invention.

In the embodiment illustrated in FIGS. 3 and 9, an intake structure 160 and filter assembly 120 are coupled together to form a filter cartridge 159 that may readily be inserted into and removed from the fluid chamber 106 as a single unit. This arrangement is particularly beneficial for assembly and maintenance. The intake structure 160 includes an outer wall 162, an intake port 163 in the outer wall, an inlet ramp 164, an inner rim 166, a pair of access handles 168 and a central opening 169. The handles 168 allow the filter cartridge to be easily lifted into and out of the fluid chamber 106. The geometry and function of the intake structure 160 will be described in more detail below. The filter assembly 120 may be attached to the intake structure 160 by any suitable mechanism as for example by bolts or other suitable fasteners. The filter assembly is sized to fill the central opening 169 within the intake structure.

To assemble the hydroclone, the filter cartridge 159 is inserted into the fluid chamber and the filtered fluid outlet 136 is plumbed to clean water conduits 236 designed to carry away the filtered water. In many embodiments, a circulating cleaning assembly 180 is positioned between the filter assembly 120 and the chamber walls 105. The design and function of the cleaning assembly will be described in more detail below. After the filter cartridge 159 has been inserted into the hydroclone, the lid 109 may be closed to seal the chamber. In the illustrated embodiment, the lid 109 is supported by a hinge 110 and a multiplicity of fasteners 111 are used to secure the lid 109 to the housing 103. The lid and housing have suitable seal structures (not shown) to form a water tight seal when the lid is closed. Any suitable fastener may be used to couple the lid to the housing. In the illustrated embodiment, the fasteners take the form of threaded studs 111 that are pivotally coupled to the housing 103. When the lid is closed, the studs may be flipped up to extend through associated slots in the lid 109 and wing nuts may be used to clamp the lid in place.

Stepped Filter

One inefficiency that we have observed in many hydroclones is that countercurrents and eddy currents within the central region of the hydroclone can induce undesired mixing that tends to stall the vortex or otherwise degrade the quality of the vortex within the hydroclone. The addition of a central filter can help reduce some of the mixing, but countercurrents and eddy currents that flow along the filter surface can still form.

The occurrence of countercurrents and eddy currents can be further reduced by the use of a tapered or conically (frusto-conically) shaped filter assembly. The wide end of the frustum is located generally towards the wide end of the fluid compartment 106 and the narrow end of the filter is located near the narrow end of the fluid compartment.

Figure 4:
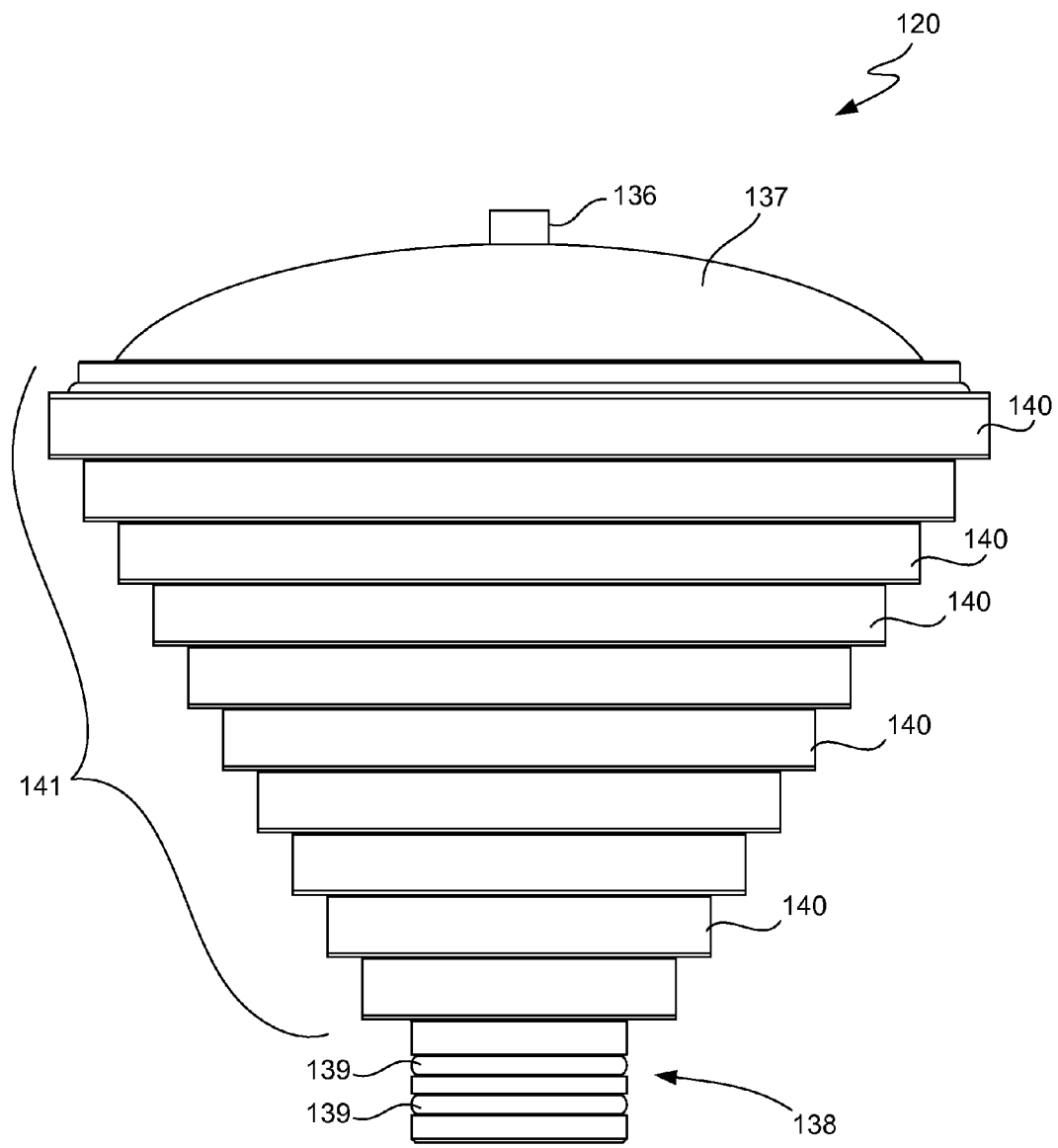
FIG. 4 is a diagrammatic side view of the stepped filter assembly illustrated in FIG. 3.

In the embodiments shown in FIGS. 1, 3 and 4 the filter assembly 120 has a substantially frusto-conically shaped main body section 141. In these embodiments, the surface of the main body section is stepped in order to even further reduce the incidence of countercurrents and eddy currents within the hydroclone chamber 110. Thus, the filter has the general appearance of a multiplicity of different sized filter rings or stages that are stacked on top of one another in descending order. From a fluid flow standpoint, each step in the stack acts as a wall that effectively blocks countercurrents and eddy currents that might otherwise flow along the adjacent face of the filter. The number of steps in the filter may be widely varied. By way of example, on the order of eight (8) to twelve (12) steps works well, although more or less steps could be provided. In the illustrated embodiment, ten (10) steps are provided. The size of the steps may also be widely varied. By way of example, in a filter assembly that has a main body section that is approximately 8 inches high and a maximum diameter of approximately 12 inches, 10 steps having a rise of approximately ¾ of an inch and a run of approximately ½ of an inch work well. Although the size and the number of steps may be widely varied in any particular application, from a fluid flow standpoint, it is believed that it is generally preferable to scale the size of the steps to the size of the chamber, rather than simply adding or subtracting steps in order to best block eddy and countercurrents.

The stepped main body 141 of the filter assembly 120 may be formed in a wide variety of manners. For example, in some embodiments, a series of filter rings are attached together to form the stepped main body. In other embodiments, the main body may be formed from a stepped frame 149 that has surface filter screens on its side faces. A variety of other fabrication techniques can be used to form the stepped main body as well.

Regardless of its construction, the filter assembly preferably has an interior space 112 that forms the filtered fluid chamber (as best illustrated in FIG. 1). The filter assembly 120 illustrated in FIG. 4 also includes a watertight cover 137 that encloses the top of the frame 149 and a drain structure 138 at a bottom of the frame. The cover includes an air vent 136 that permits air to be purged from the filtered fluid chamber. The drain has a sealing structure that permits a filtered fluid outlet pipe (not shown) to be coupled to the filter assembly. In the illustrated embodiment, the seal structure takes the form of a pair of spaced apart O-ring seals 139 although any of a wide variety of other suitable sealing structures may be used.

The filter itself may be formed from a wide variety of materials. The environment within the hydroclone can be relatively harsh in many applications and it is typically undesirable to require frequent changing of the filters. Therefore in such applications it is often desirable to form the filter from a rugged, non-corrosive material. By way of example, in relatively abrasive environments, corrosion-resistant metal materials such as nickel, nickel alloys, nickel copper alloys, stainless steel, titanium and aluminum may be used in the filters. In less abrasive environments plastic and other suitable non-corrosive or corrosion resistant materials may be used.

Figure 5A:
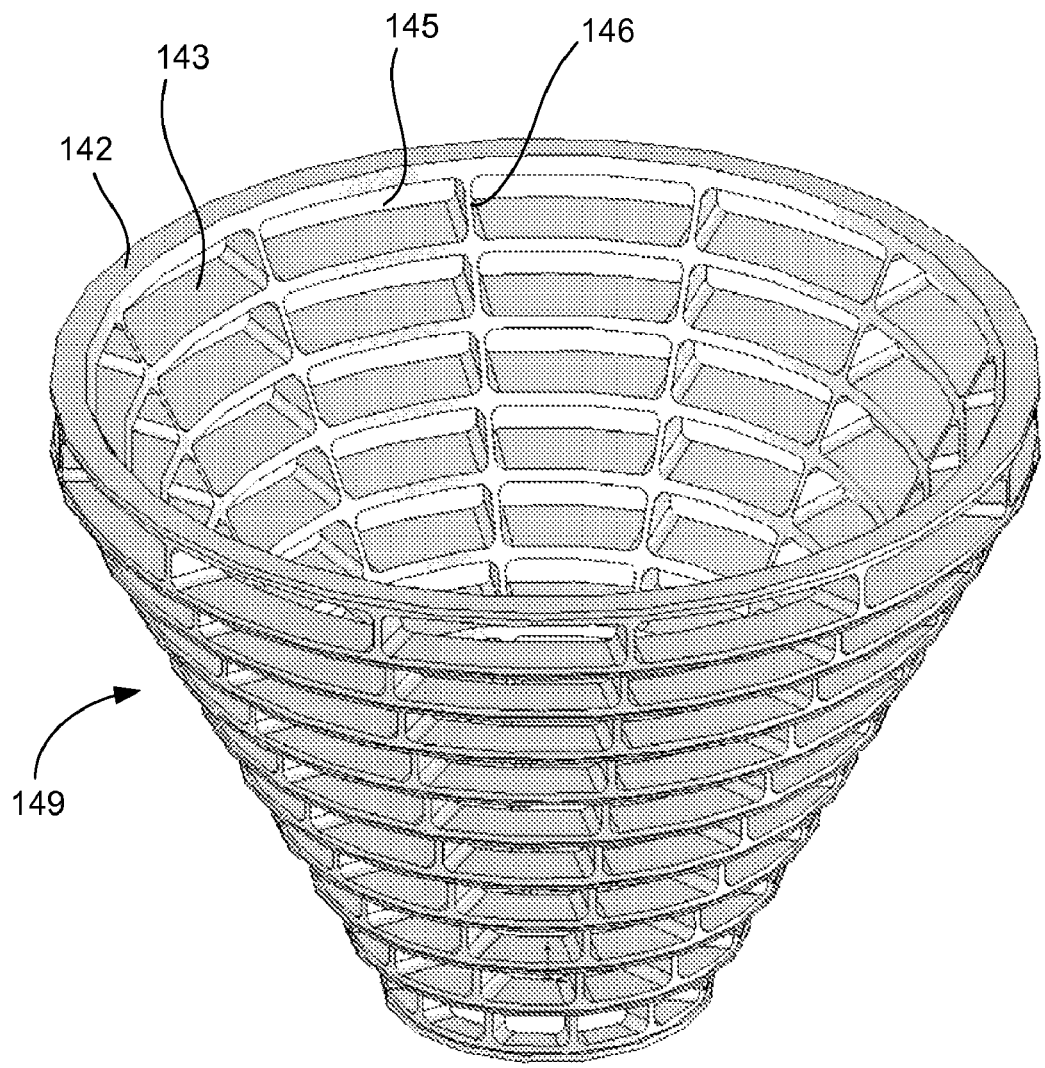
FIG. 5(a) is a perspective view of an embodiment of a filter frame suitable for use in a stepped filter assembly.

Referring next to FIG. 5(a), one suitable filter frame construction will be described. In the illustrated embodiment, the frame is formed as a single unitary structure that has ten steps. As mentioned above, the number of steps may be widely varied. Each step 140 of the frame has a top rim 142, a bottom rim 143, a plurality of circumferentially spaced slots 145 that are separated by risers 146. Such a frame may be fabricated using a wide variety of techniques. By way of example, the frame may be milled from a single piece, it may be formed by molding or casting or powdered metallurgy techniques. Alternatively, the frame may be formed by welding, adhering or otherwise attaching a plurality of distinct rings or by a variety of other conventional fabrication processes. In still other embodiments, the frame filter assembly may be formed from multiple pieces that are coupled together by other techniques.

Figure 5B:
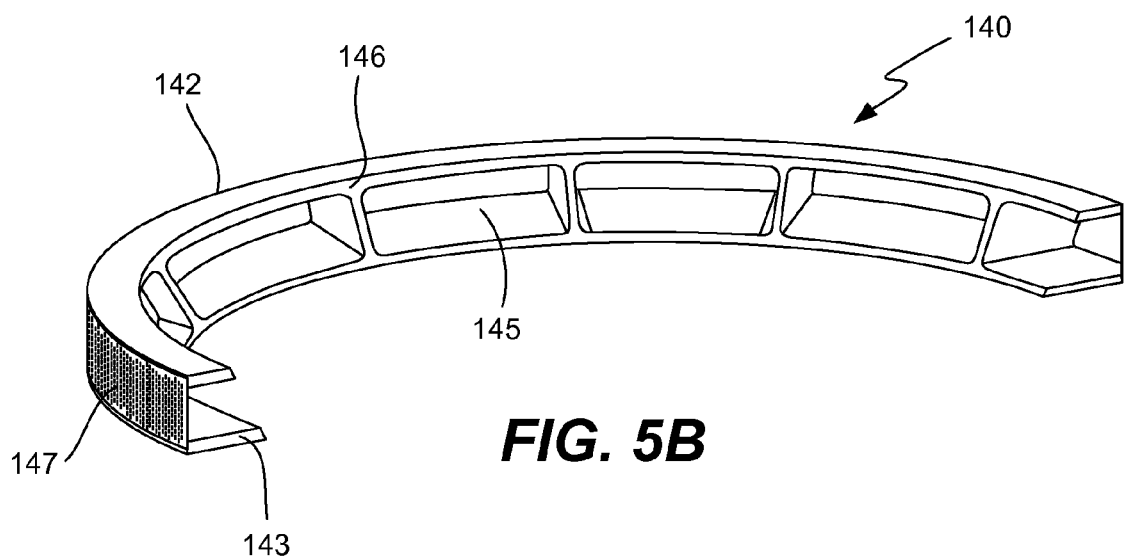
FIG. 5(b) is a diagrammatic perspective view of a single ring of the filter frame illustrated in FIG. 5(a) with a surface filter mounted thereon.
Figure 5C:
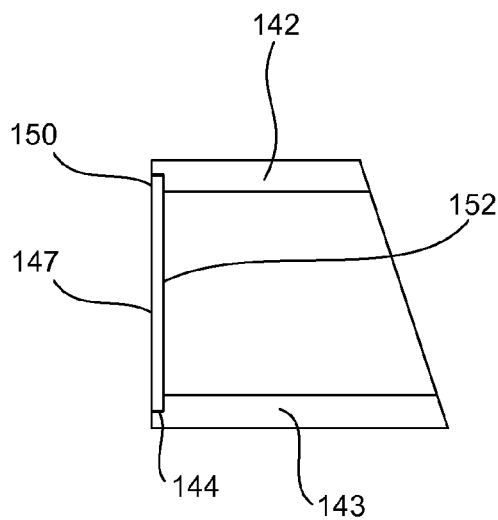
FIG. 5(c) is a cross sectional view of the filter frame ring illustrated in FIG. 5(b)

Referring next to FIGS. 5(b) and 5(c), in the described embodiment, a fine filter screen or mesh 147 is secured around each step 140 of the frame 149 by suitable means such as welding. As best illustrated in FIG. 5(c), each rim has a notch 144 that the screen 147 can be secured to.

The geometry of the openings in the mesh may be widely varied to meet the needs of a particular application. In the illustrated embodiment, the openings 148 are arranged as vertically extending slots, with the width of the slots being the mesh size (gauge) of the filter. Slots are used because a slot of a given surface area will generally pass more fluid than a series of circular holes that have a similar opening surface area. The slots 148 are arranged generally vertically as opposed to generally horizontally in order to reduce the probability of particles getting caught in the holes. This works because the exterior openings in the vertical slots extend substantially perpendicular to the crossing fluid flow while horizontally extending slots would extend in parallel to the crossing fluid flow thereby giving particles a greater opportunity to lodge in the opening.

The interior geometry of the slots 148 is also important. Generally, the slots are designed to be narrowest at the outer surface 150 of the filter and open progressively wider towards the inner surface 152. Again, this helps reduce the probability of clogging which would more likely occur if the slots maintained the same width throughout the ring or were constricted or tortuous. The cross sectional geometry of the holes may vary widely and in many situations will be dominated by the manufacturing requirements of the process used to create the filter. In some embodiments, the taper angle is constant. In other embodiments, the taper angle may vary with the depth of the opening such that the taper angle is not constant.

The mesh size of the filter may also be widely varied to meet the needs of a particular application. In general, filter screens having pore mesh sizes on the order of 1-500 microns are appropriate for most applications. In pre-filters used in drinking water treatment applications, mesh sizes in the range of 5-50 microns are more typical. Surface filters having mesh size below 5 are obtainable, but they tend to have difficulty passing sufficient water to meet the needs of many application.

Figure 6:
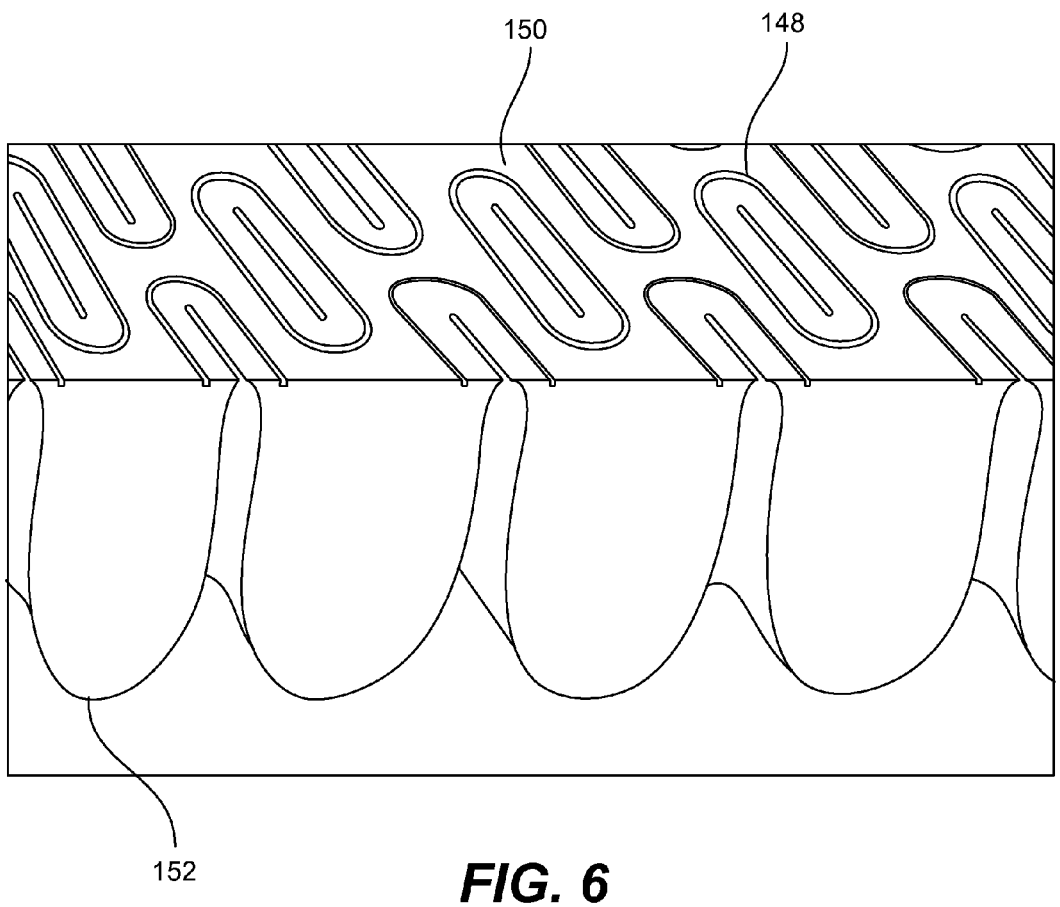
FIG. 6 is a diagrammatic perspective view illustrating the geometry of representative electroformed filter pores.

Any suitable process can be used to form the filter screens. One class of surface filter screens that has been found to work particularly well are electroformed precision metal surface filters. The mesh of the electroformed surface filter, as well as the geometry, orientation and density of the pores can be readily adjusted to meet the needs of particular applications. By way of example, electroformed precision metal filter screens having with widths on the order of 5 to over 500 microns are available and as the technology develops, it is expected that even smaller pore diameter filters will become readily available. FIG. 6 illustrates the cross section of a typical electroformed precision metal surface filter which works well to form the described stepped filter. As can be seen therein, the slots 148 are designed to be narrowest at the outer surface 145 of the filter and open progressively wider towards the inner surface. Although the described electroformed precision metal filters work well, it should be appreciated that the filters may be formed using a variety of other technologies and they do not need to be formed from metals.

Figure 7:
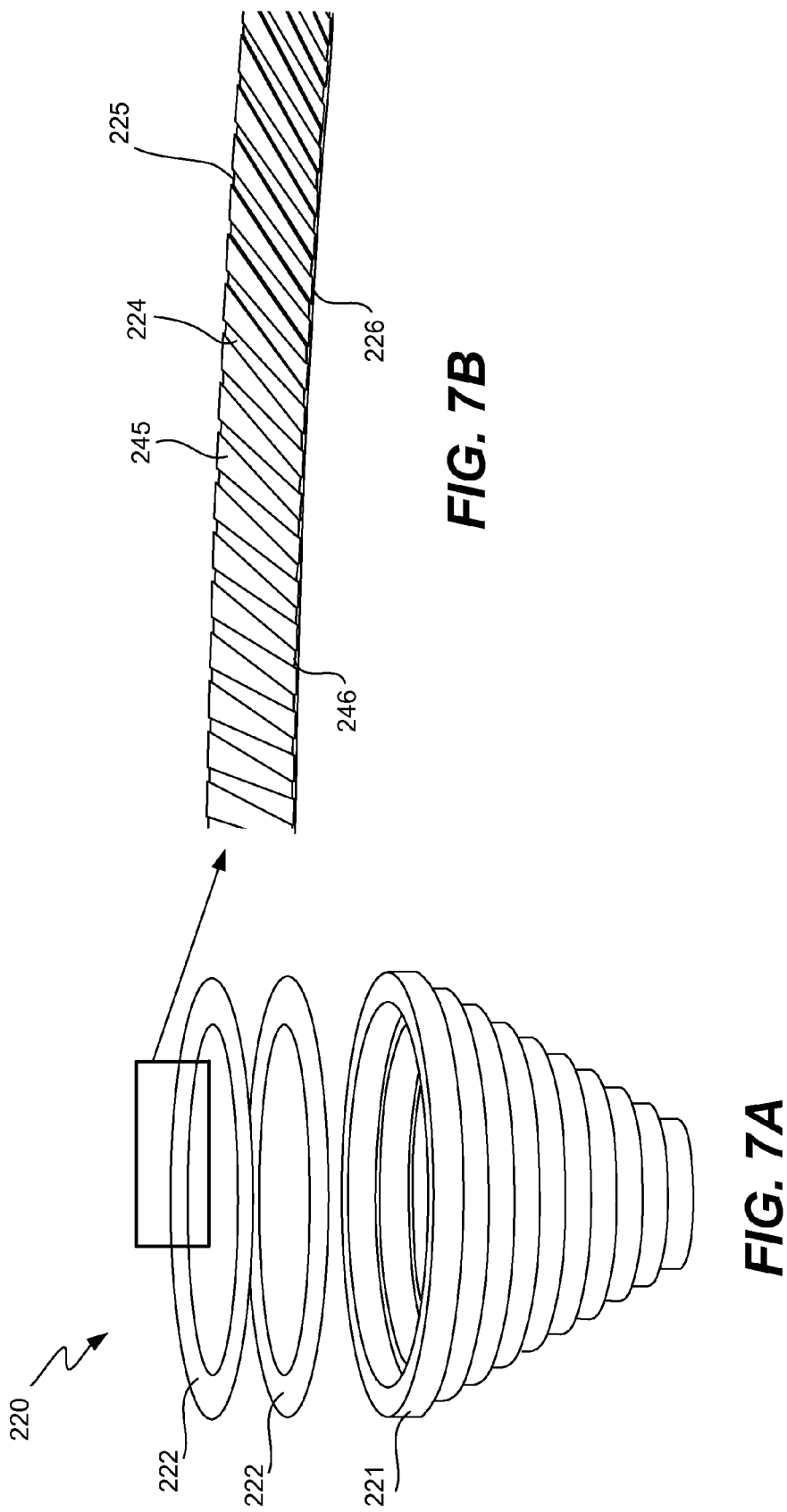
FIG. 7(a) is a diagrammatic perspective view of a part of a stacked disc filter assembly in accordance with another embodiment of the filter design.
FIG. 7(b) is an enlarged diagrammatic top view of a section of an individual filter ring suitable for use in the filter of FIG. 7(a) highlighting the geometry of the grooves.

Referring next to FIG. 7, another suitable surface filter design will be described. In this embodiment, each step or stage 221 of the filter assembly 220 is formed from a stack of thin rings 222. Stacked rings type surface filters are generally known in the filtering arts as stacked disc filters. Typically, each ring has a number of radially extending grooves 224 etched into a surface of the ring as best illustrated in FIG. 7(b). The grooves do not extend the entire thickness of the ring so that one surface of the ring is smooth, while the opposing surface has the grooves. When rings are stacked with the grooves of one ring facing the flat surface of the adjacent ring, the grooves 224 form small fluid flow channels. Of course, in other embodiments, grooves may be formed in both sides of the rings.

The grooves 224 are tapered with the radially outer end of the grooves 225 being narrower than the inner end 226 of the grooves. This helps prevent clogging as discussed above. The rings may be formed of any suitable material and the described filter construction is very rugged. By way of example rings having thicknesses in the range of 10 to several hundred microns thick with grooves having depths on the order of half to 80 percent of the ring thickness work well. Thus, for a filter having 10 micron slots, rings having a thickness on the order of 15 to 25 microns work well, although it should be apparent that the depth of the groove relative to the thickness of the ring can be widely varied to meet the needs of any particular application. The same technology can be used to form filters having virtually any mesh size.

Figure 8:
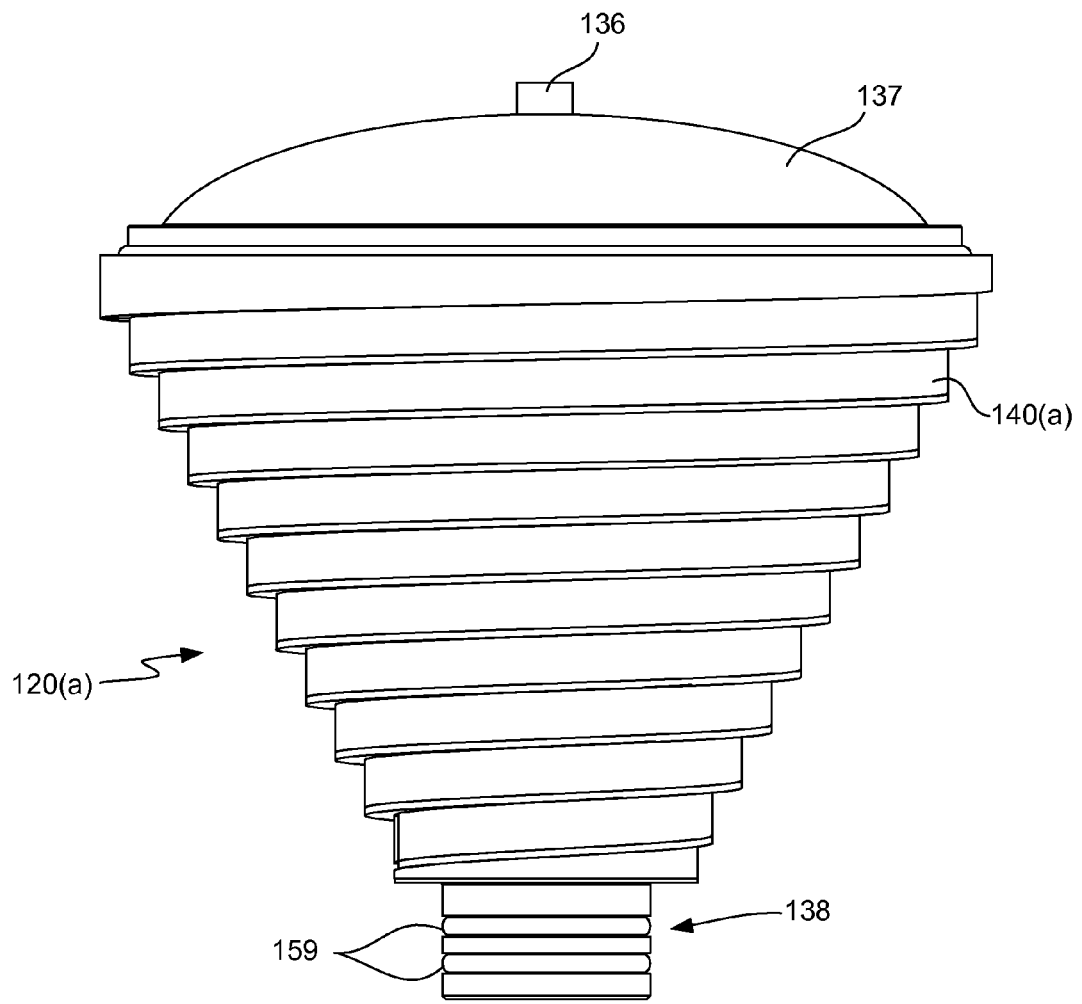
FIG. 8 is a diagrammatic side view of a stepped filter assembly in accordance with another embodiment of the filter design that includes a spiral step.

In the embodiments described above, the stepped filter assembly 120 is formed from a series of discrete steps or stages. In other embodiments the steps may be arranged as a spiral as illustrated in FIG. 8. The spiral is tapered in the same direction as the vortex is intended to spiral. With this arrangement, the spiral step 140(a) helps further promote the spiral flow of fluid and downward motion of the particles within the hydroclone chamber 110. In other respects, the filter assembly 120(a) may be designed similarly to the filter assembly described above with respect to FIG. 4.

Although a few specific stepped filter designs have been described, it should be apparent that the geometry of the steps can be widely varied. In the described embodiments, the steps of a particular filter are sized substantially the same. However, in alternative embodiments, the sizes (e.g., the rise and run) of the steps in particular filter may be varied to optimize their efficacy or to address other considerations. In spiral step embodiments, a single spiral or multiple interleaved spirals may be used.

The primary described embodiments utilize a substantially frustoconically shaped stepped filter. Although this design works very well, a variety of modifications may be made to the geometric design of the filter and it will still work substantially better than other designs. As suggested above, a smooth conically shaped filter substantially reduces eddies and countercurrents relative to a smooth cylindrical filter. If a tapered filter has a waved or undulated surface, the undulations will even further reduce the occurrence of eddies and countercurrents. Thus, it should be apparent that although the stepped filter works particularly well, improvements can be obtained using a variety of other tapered filter geometries as well.

Formation of the Hydroclone

It is generally desirable to create a relatively stable and well formed vortex within the hydroclone chamber. There are a number of features in the illustrated embodiment that are designed to help promote a stable vortex. By way of example, the design of the inlet and intake structure 160; the geometry of the conically shaped fluid compartment 106 and the filter assembly 120; the design of the effluent outlet 133; and the relative flow rates at the inlet 130, effluent outlet 133 and filtered fluid outlet 136 all impact the nature of the vortex that is created within the hydroclone.

The geometries of the conically shaped fluid compartment 106 and the filter assembly have a significant impact on the vortex that is created. Generally, the filter is tapered at an angle that is less than the chamber walls (relative to vertical) so that the distance between the chamber walls and the filter decreases towards the bottom of the hydroclone. By way of example, taper angles in the range of 30 to 50 degrees relative to vertical, as for example 40 degrees work well for the chamber walls. The desired taper angle of the filter will depend on the taper angles for the chamber walls and other factors such as the relative amount of water that is intended to flow out the filtered fluid outlet 136 vs. the effluent outlet 133. Typically, it is desirable for the filter to taper at an angle of 10-15 degrees less from vertical than the chamber walls. Thus, tapers angles in the range of 15 to 40 degrees relative to vertical tend to work well for the filter. By way of example, for a chamber that tapers at an angle of 40 degrees from vertical, tapers on the order of 25-29 degrees from vertical work well for the filter.

The geometry of the fluid inlet effects the vortex that is formed and can have a significant impact on the path that particles will take within the hydroclone. It is believed that particles do not exactly follow the path of the vortex. Rather, they tend to move under the influence of the drag forces created by the moving water. Particles which reach the inside wall of the housing can tend to move up the wall, away from the outlet, instead of down the wall toward the outlet. A properly designed inlet ramp will insure that the path of the particles are overwhelmingly influenced by the downward flow of water, versus the upward component of the reaction force at the housing wall.

In the illustrated embodiments, an intake structure 160 having an inlet ramp 164 is provided to introduce the inlet fluid stream substantially tangentially into the hydroclone chamber 110. The design and geometry of the inlet ramp can be varied to meet the needs of a particular design. One intake structure that is particularly well suited for use in the hydroclone is illustrated in FIG. 10. As seen therein, the intake structure 160 includes an annular outer wall 162, an intake port 163 in the outer wall, an inlet ramp 164, an inner rim 166, a pair of access handles 168 and a central opening 169.

The outer wall 162 is sized to fit snugly within an upper, non-tapered portion 170 of the fluid compartment 106. The peripheral surface of the outer wall 162 has a plurality of grooves 171 that match corresponding guide tabs 172 on the inner walls of non-tapered portion 170 of fluid compartment 106. The guide tabs are arranged to align the intake port 163 with fluid inlet 130 so that the influent stream enters the hydroclone substantially tangentially at the right position relative to the inlet ramp 164.

The inlet ramp 164 is tapered downward to insure that the influent stream begins the downward rotational flow that is desired for the vortex as it makes its initial rotation within the chamber. The decent angle for the ramp can be varied somewhat, but generally it is desirable to insure that the fluid descends by at least about half the height (e.g., the radius) of the inlet stream by the time the fluid makes its first complete revolution about the fluid compartment. By way of example, descents in the range of 25 to 75 percent of the height of the inlet stream appear to work well. If there is no ramp or if the decent angle of the ramp is significantly less than that amount, some of the particles may get trapped near at the top of the fluid chamber instead of following the downward flow of the vortex. In the embodiment illustrated in FIG. 10, the ramp 164 smoothly descends approximately half of the height of the influent stream over 360 degrees. The ramp 164 is annular and has a substantially constant width.

Figure 10A:
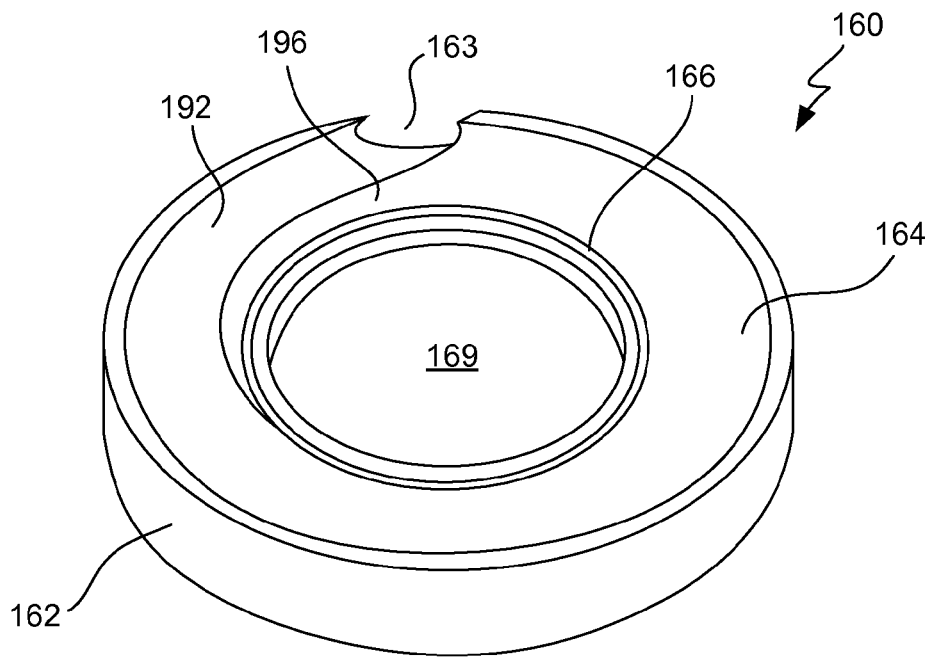
FIG. 10(a) is a perspective bottom view of the intake structure utilized in the filter cartridge illustrated in FIG. 9.
Figure 10B:
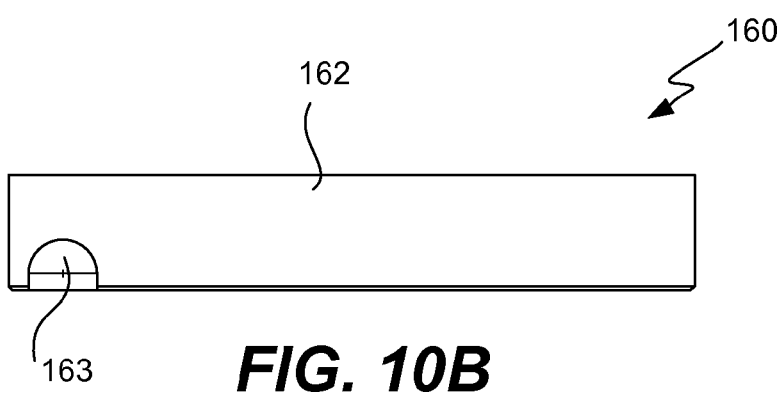
FIG. 10(b) is a side view of the intake structure illustrated in FIG. 10(a)
Figure 10C:
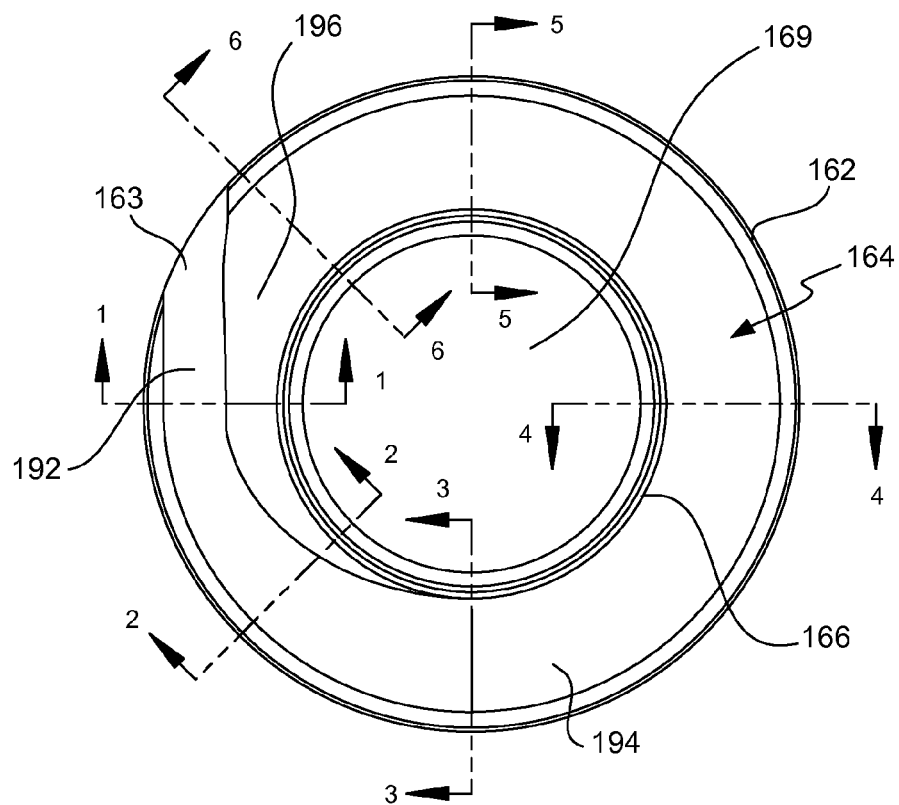
FIG. 10(c) is a bottom view of the intake structure illustrated in FIG. 10(a)
Figure 10D:
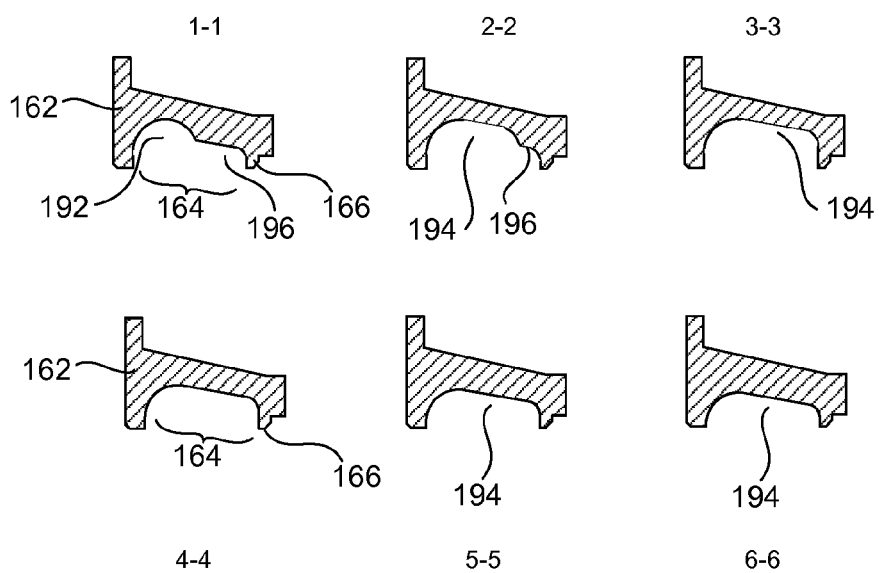
FIG. 10(d) illustrates a series of cross sectional views of the intake structure illustrated in FIG. 10(c).

The initial part of the inlet ramp 164 is configured to make a smooth transition from the intake port 163 to the full width of the ramp as best shown in FIGS. 10(c) and 10(d). FIG. 10(c) is a bottom view of the ramp and FIG. 10(d) shows the cross section of the ramp at various locations along the ramp. As best seen FIG. 10(c), and the cross section 1-1 of FIG. 10(d), the inlet ramp has a primary channel section 192 that initially closely matches the geometry of the intake port 163/fluid inlet 130. The primary channel section 192 extends from the intake port 163 to the radius followed by line 1-1 of FIG. 10(c) and is oriented substantially perpendicularly to the radius followed by line 1-1. This section of the primary channel 192 is intended to introduce the influent stream substantially tangentially into the hydroclone chamber. From the radius of cross section 1-1, the primary channel 192 begins to widen gradually to the point of cross section 3-3 where the widened primary channel extends the full width of the ramp and transitions into the secondary channel 194. From cross sections 3-3 to 6-6, the full-width, secondary channel gradually descends. At the intake port 163, the primary channel 192 begins to enter the widened and descending secondary channel 194. From the inlet port 163 to section 3-3 the secondary channel continues to descend while gradually decreasing in width. Thus, in the region between the inlet port 163 and cross section 3-3, the secondary channel 194 gradually decreases in width as the width of the primary channel 192 increases. At cross section 3-3 the secondary channel is completely subsumed by the widening of the primary channel. As suggested above, in the illustrated embodiment, the height of the channel 194 at cross section 6-6 which is just before the intake port 163 is designed to be about half of the full height of the intake port 163. The described intake structure 160 helps promote the formation of a good vortex within the hydroclone chamber 110. Although a particular intake structure that is very well suited for use in the hydroclone has been described, it should be appreciated that a variety of other intake structures can be used in other embodiments of the invention.

Figure 12:
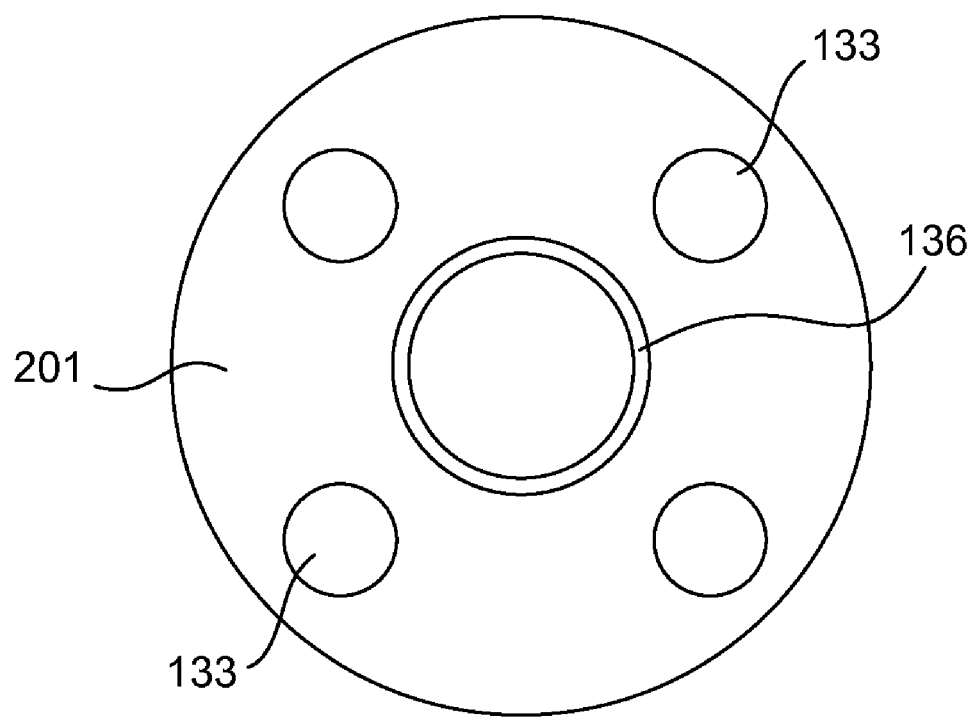
FIG. 12 is a top view of an effluent outlet plate in accordance with one embodiment of the present invention.

The design of the effluent outlet 133 also has a significant impact on vortex formation. A variety of effluent outlet designs may be used to discharge the concentrated effluent stream. By way of example, one suitable effluent outlet design is illustrated in FIG. 12, which is a cross section of the effluent outlet taken along line 12-12 of FIG. 1. As seen therein, the bottom of the fluid compartment 106 is not fully open. Rather, a plate 201 is provided at the bottom of the conical (frusto-conical) section of the fluid compartment 106. The plate has a plurality of holes that together constitute the effluent outlet. Four effluent outlet holes are provided in the illustrated embodiment, although it should be appreciated that the plate is not a prerequisite and the number and sizes of the effluent outlet holes may be widely varied. The plate defines a lower end for the vortex and creates a defined boundary between the hydroclone chamber 110 and a plenum 204 that is in the effluent flowstream. Thus, the plenum 204 is not subject to the vortex. A conduit 236 (or other plumbing) extends through a central region the plate 201 and is coupled to the filter assembly within the fluid compartment 106. The conduit 236 does not exit the housing from within the hydroclone region 110 or any other part of the fluid compartment 106. Rather, it exits from the plenum 204, which is not subject to the vortex. With this arrangement the conduit 236 does not disrupt the vortex which can significantly decrease the stability of the vortex. Rather, the filter assembly 120 and all of its associated plumbing within the fluid compartment 106 are located at the center of the vortex which helps promote a stable vortex.

Another important factor in establishing a stable vortex is the selection of relative flow rates out of the filtered fluid and effluent outlets. The relative outlet flow rates can be varied relatively widely based on the needs of a particular system. By way of example, in many applications it is desirable to output on the order of 20 to 60 percent of the influent flow as filtered fluid. If significantly more than 50% of the influent is passed through the filter, the stability of the vortex may suffer significantly. If too little of the influent is drawn through the filter, then the filtered fluid flowrate and the recovery percentage (i.e., the ratio of the filtered fluid output to the fluid input) tends to suffer.

Cleaning the Filter

A number of efforts have been made to reduce the clogging rate of the described filters. However, over time, any filter design will experience some clogging or blockage. Generally, the flow dynamics of the crossflow filter helps prevent large particles (i.e., particulates that are large relative to the minimum dimension of the filter openings) from clogging the filter slots. This is because the current flowing across the filter surface tends to push the large particulates aside so it is difficult for the large particles to lodge within a filter opening.

In the embodiment illustrated in FIG. 5(*b*) the filter openings are arranged as vertically oriented slots that extend substantially perpendicularly relative to the current flowing across the filter surface. The vertical slot orientation further reduces the clogging rate because the particles carried in the vortex current flowing across the filter tend to relatively quickly pass the narrow slot. Additionally, the filter openings are generally arranged depth-wise so that they are narrowest at the outer edge of the filter and get wider towards the inner side of the filter. This helps reduce the probability that a particulate that is narrow in one direction can enter the filter and then get caught within the filter pores. In practice it has been observed that the particulates that are most likely to affirmatively lodge within a filter pore are particles that have a dimension that is just slightly larger than the minimum pore dimension (e.g. the width of the slots illustrated in FIGS. 5 and 6). These particles tend to be small enough to be sucked partially into a filter pore but are too large to pass through the opening. Since they are relatively small, they may not be exposed enough to be swept away by the vortex flowing across the filter. Thus, if no precautions are taken, the filter will tend to clog over time.

Figure 11:
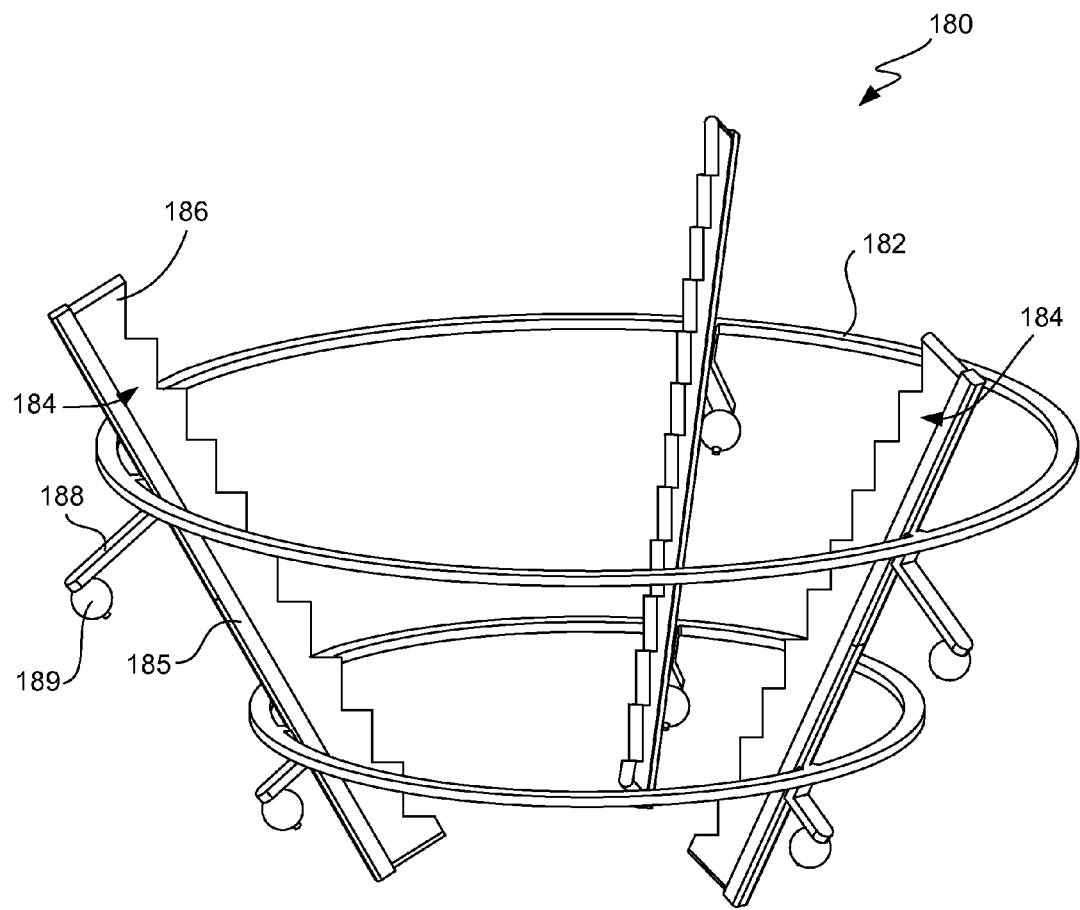
FIG. 11 is a diagrammatic side view of an embodiment of a brush assembly.

In order to further reduce the filter clogging rate, a filter cleaning system may be incorporated into the hydroclone design. In the embodiment illustrated in FIG. 3 a circulating cleaning assembly 180 is positioned as a freestanding assembly within the hydroclone chamber 110 to facilitate such cleaning. FIG. 11 illustrates a particular cleaning assembly that utilizes brushes. The brush assembly 180 includes a frame 182 that carries a plurality of brushes 184. In the embodiment shown, three brushes 184 are provided although the number of brushes used in a particular system may be widely varied. Each brush has a base 185 that is part of the frame and carries a number of brush filaments 186. The frame also has a plurality of extensions 188 that carry rollers 189. The frame and brushes are sized so that the when the brush assembly is positioned within the hydroclone chamber 110, the rollers 189 engage the inner surface of the hydroclone chamber walls 105 and the brush filaments engage the outer surface of the filter assembly 120. In others embodiments, squeegees or other suitable structures may be used in place of or in conjunction with the brushes to clean accumulated particles from the filter surface. In the illustrated embodiment, the brushes are stepped to match the steps in the filter assembly 120. Such stepping of the brushes tends to improve their performance, although it is not required.

When the hydroclone is operating, the vortex within the hydroclone chamber 110 causes the brush assembly 180 to spin around within the chamber. With this arrangement, the brush filaments 186 (or other suitable cleaning structures) are drawn across the face of the filters thereby dislodging many of the particulates. Thus, the hydroclone is self-cleaning to some extent.

Although one particular cleaning structure is illustrated in FIG. 11, it should be appreciated that a wide variety of other cleaning structures may be used in place of or in addition to the described brush arrangement. For example, in the illustrated embodiments, the rollers engage the housing. In alternative embodiments, the rollers may be arranged to engage the filter assembly instead of, or in addition to, the housing. In still other embodiments the rollers may be replaced (or supplemented) by skids or other passive structures that are designed to slide across the housing or filter walls. In some embodiments, skids alone might be provided, whereas in other embodiments, skids may be combined with rollers. For example, the rollers may be arranged to face outward and the skids might be arranged to face inward, or vice versa. If desired, rollers or skids or other suitable structures may be provided to engage the top (e.g. intake structure 160) or bottom (e.g. plate 201) surfaces of the hydroclone chamber.

In the initially described embodiment, the brushes or other cleaning structures are arranged to engage the surface of the filter so that they clean the filter at least in part by physically "wiping" the surface of the filter. In other embodiments the brushes or other cleaning structures do not engage the filter surface but instead are suspended slightly above the filter surface. In this way they increase the tangential velocity of the fluid local to the filter surface, increasing the shear forces on the particulates and thereby dislodge accumulated particles from the filter surface.

In the primary described embodiment, it is contemplated that the frame has an average specific gravity that is higher than the fluid it displaces so that gravity generally urges the rollers into contact with the housing. In other embodiments, the buoyancy of cleaning structure may be arranged so that the cleaning structure has a neutral or positive buoyancy to facilitate the desired contact (or reduced contact) between the cleaning assembly and the filter.

Although the brushes work very well to reduce the buildup of particulates along the surface of the filter, over time the filter will tend to clog. Some of the clogging is due to the entrapment of small diameter particulates in the filter pores as previously discussed. However, that is not the only clogging mechanism. During operation, the pressure within the hydroclone chamber 110 will generally be higher than the pressure within the filtered fluid chamber 112. Thus, when a particle is lodged within or even just positioned against an opening, there will be some pressure exerted against the particle tending to hold it in place on the filter surface.

During operation of the hydroclone, particles will get trapped within or be drawn against some of the filter pores. These trapped particles partially block some of the pores thereby reducing the flow of fluid through the filter. When the fluid is being driven through the hydroclone by a pump 242 as in FIG. 1, reduced fluid flow is accompanied by increased pressure. Although the overall flowrate may decrease somewhat when the filter begins to clog, the hydroclone continues to operate well for a period of time. If the filter is permitted to continue to clog, there comes a point when the performance of the filter will drop off quite dramatically. The mechanism that causes the drop-off is not fully understood, however it is believed that the drop-off is due to the accelerated accumulation of particles on the surface of the filter.

In operation, the fluid flowing at the surface of the filter has two primary components that effect the movement of suspended particles in the vicinity of the filter. The two flow components that affect the particles are the tangential flow along the surface of the filter and the radial flow component that is substantially perpendicular to and through the surface of the filter. Generally the hydroclone utilizes the tangential flow component (i.e. the cross flow), to keep suspended particles moving along the surface of the filter until they exit the device through the effluent outlet 133. The cross flow also drives the cleaning assembly 180 along the surface of the filter to further push particles along.

When a given particle moving across the surface of the filter passes over a filter pore (e.g. a slot), there is a suction type force that draws the particle towards the pore and as a result, a frictional type force is generated that resists further movement along the surface of the filter. The resistive force is believed to be proportional to the pressure drop across the filter. When the resistive force overcomes the force of the cross flow, the particles stop moving and impede the flow through the pores. As discussed above, in some instances, particles wedge into the pores thereby "clogging" the filter. In many other instances, particles are not actually wedged into the pores but held there by the force of the water pressure. The greater the pressure differential between the two sides of the filter, the more particles will be held in place by the water pressure. When the particles stop and the flow is impeded the pressure in the hydroclone chamber 110 goes up relative to the pressure within the filtered fluid chamber 112, thus increasing the water pressure pushing particles against the surface of the filter, which effectively creates a positive feedback loop. Once a critical pressure differential develops between the hydroclone chamber 110 and the filtered fluid chamber 112, particles very rapidly build up around the pores and block the filter and even the brushes cannot fully dislodge the particles. In this state, very little water passes through the filter and the filter becomes ineffectual. For practical purposes, no amount of pressure increase on the working side of the filter can fix the problem. It is noted that the blocking that occurs at higher pressure differentials is very different than what might be expected in a depth filter. Specifically, in normal filters, the volume of fluid flowing through the filter will increase when the pressure differential (pressure drop) across the filter increases.

The described blocking problem can be remedied by decreasing the pressure differential between the hydroclone chamber 110 and the filtered fluid chamber 112. When the pressure differential is eliminated (or reduced below the critical threshold), the water pressure holding particles against the filter is reduced and as a result, any particles that are not trapped move away from the filter pores. A number of mechanisms including gravity, the tangential fluid flow across the filter and the brushes combine to cause the particles to fall away.

Most simply, if the hydroclone is turned off for a moment so that the vortex settles and the pressure differential between the hydroclone chamber 110 and the filtered fluid chamber 112 is eliminated, then many of the particles that are clogging the filter will simply fall away. Thus, in many applications, the filter can be at least partially cleaned simply by turning off the hydroclone for a brief period. This self-cleaning characteristic can be even further enhanced by briefly running the hydroclone in reverse. That is, the filter can be "flushed" by applying a back-pressure across the filter such that water briefly flows from the filtered fluid compartment 112 back into the hydroclone chamber 110. This backpressure affirmatively dislodges particulates from the outer surface of the filter.

Figure 13:
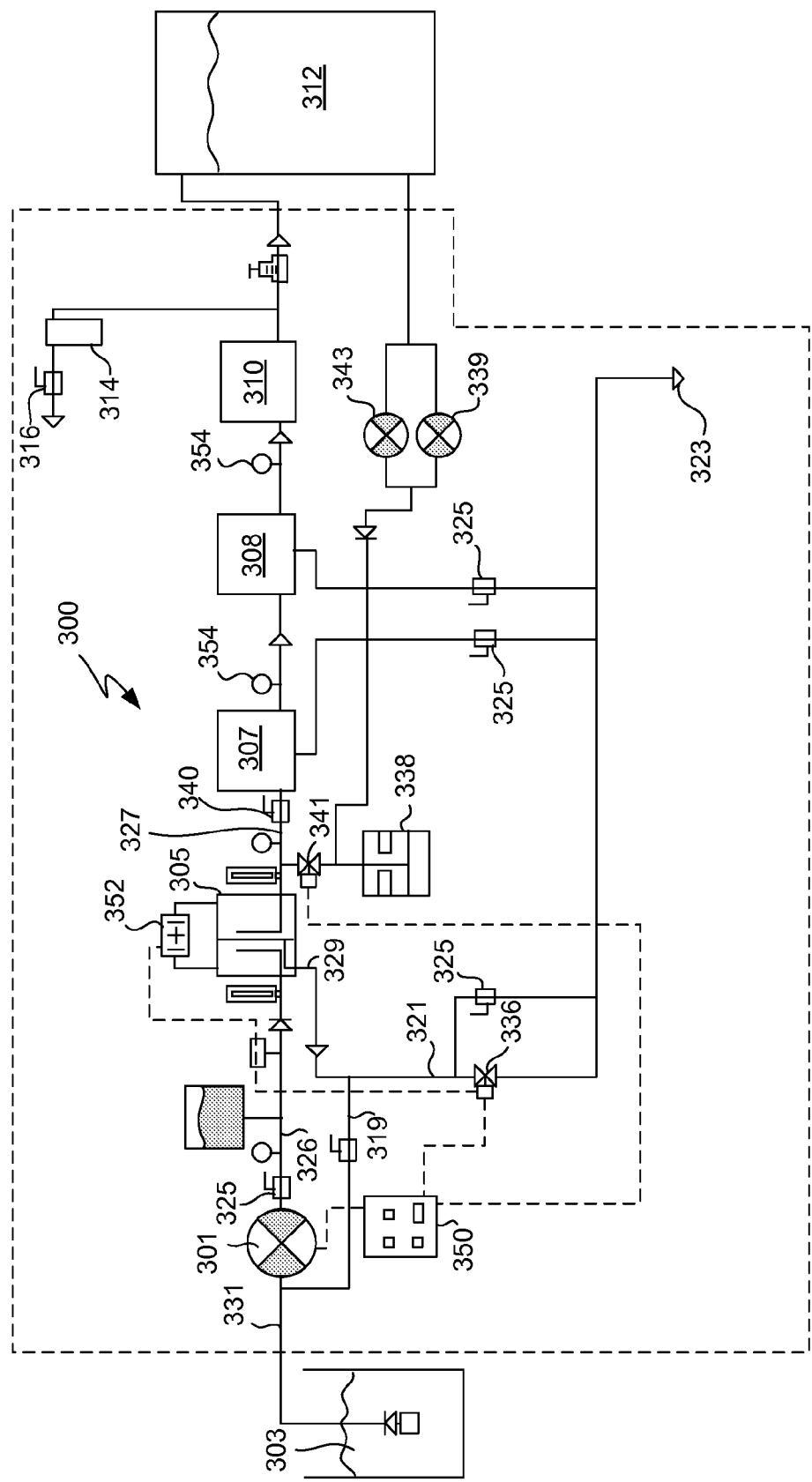
FIG. 13 is a block diagram illustrating a representative water filtering system that incorporates a hydroclone.

Another way to reduce the pressure differential is to insert a valve 240 into the clean water conduits 236 downstream of the filtered fluid outlet 136. Such an arrangement is illustrated in FIG. 13. The valve may periodically be turned off which causes a pressure surge within the filtered fluid chamber 112. This periodic pressure surge reduces the pressure differential between the hydroclone chamber 110 and the filtered fluid chamber 112, which has the effect of freeing large particles that are held against the filter by the force of the pressure differential. In some situations, the pressure surge can be large enough to create a brief pressure differential in the opposite direction, which has the effect of a mini-purge that further helps remove trapped particles from the filter surface.

In other embodiments, the inlet pump 242 can be temporarily turned off in addition to closing the clean water conduit valve 240, which further reduces the pressure within the hydroclone chamber 110 as the water drains from the effluent outlet 133. If the inlet pump is turned off long enough, some filtered water within the filtered fluid chamber 112 may flow back into the hydroclone chamber 110, thereby lightly flushing the filter, which has the advantage of removing trapped particles in addition to releasing particles that are held against the pores by water pressure.

Although turning off the inlet pump while turning off the filtered fluid flow is an effective way to clean the filter, it is often not desirable to turn off the inlet pump for any extended period of time because it may cause the vortex within the hydroclone to break down. Another way to accomplish the same effect is to affirmatively pump clean water into the filtered fluid chamber 112 while the inlet pump continues to operate so that the pressure within the filtered fluid chamber 112 exceeds the pressure within the hydroclone chamber 110. This causes fluid to flow in a reverse direction through the filter (i.e. flushes the filter) thereby releasing particles held against the filter surface as well as ejecting any particles that may be trapped within the filter.

The hydroclone can be plumbed in a variety of ways to facilitate the backflushing of the filter. For example, a reversible pump positioned in the clean water conduit 236 may be used to draw water from the filtered fluid chamber. With this arrangement, the filter can be flushed by simply reversing the clean water pump for a brief period. In other arrangements, a dedicated flushing pump may be plumbed to the filtered fluid outlet, or to the top of the filtered fluid chamber in order to facilitate flushing the hydroclone when desired.

Applications

The described hydroclone can be used in a wide variety of water filtering, pre-filtering and water treatment applications. By way of example, many drinking water treatment facilities use a series of screens and consumable filters that have progressively finer filtering meshes. The described hydroclone can be used in place of one or more of the filter stages. The hydroclone is particularly well suited for applications that require low maintenance; applications that begin with relatively dirty water; and applications that require a relatively small filter footprint while handling a relatively large volume of water through the filter.

The described hydroclones are well suited for use in relatively small scale drinking water filtering applications. In drinking water applications that require very high levels of filtering, the hydroclone is very well adapted for use as a pre-filter (as for example a 5-20 micron prefilter). Since the hydroclone utilizes a surface filter as opposed to a consumable depth filter, fewer filter stages are typically required to pre-filter the drinking water. In drinking water applications that permit larger (e.g. 2-10 micron) particles, the hydroclone can be used as the final filter.

The described hydroclones are also very well suited for ballast water filtering applications. As will be appreciated by those familiar with international shipping, many cargo (and other) ships utilize ballast water for load balancing. Environmental concerns have caused some countries to require (or contemplate requiring) ships to filter their ballast water before dumping it back into the sea. Since the described hydroclones require little maintenance and are very compact for the volume of water they can handle, they are well suited for ballast water treatment applications.

In various filtering applications, multiple hydroclones can be plumbed together in parallel or in series. Typically hydroclones having the same filter mesh size would be plumbed in parallel to facilitate handling a greater volume of water. Graduated filtering can be accomplished by plumbing hydroclones having progressively smaller meshes together in series.

Filtration Systems

Referring next to FIG. 13 a representative water filtration system that includes a hydroclone in accordance with one embodiment of the invention will be described. In the water filtration system 300, a pump 301 draws water from a water source 303. Any suitable water source can be used, including river water, well water, collected water, bilge water or any other suitable source. The source water is delivered to the hydroclone 305, which acts as a prefilter. Filtered water that exits the hydroclone is directed through a pair of fine filters 307 and 308 that filter particles down to a level (e.g. 1 micron) that is desired in the particular application (e.g. for drinking water). By way of example, fine filters having mesh sizes of 5 and 1 micron respectively work well with a hydroclone having a filter pore size of 10 microns. Of course, in other applications, fewer or more or no fine filters could be used downstream of the hydroclone. In still other applications a pair of hydroclones having different opening sizes may be used as the prefilters. Such an arrangement is particularly appropriate when the source water is considered quite dirty (i.e., has a high concentration of suspended particles).

After passing through the filters, the clean water is directed to a bacterial control unit 310. Any of a variety of conventional bacterial control units may be used in the water treatment system. By way of example, germicidal ultraviolet light and ozone are the two most common non-chemical bacterial control mechanisms used in water treatment systems.

After passing through the bacterial control unit 310, the water may be stored in a clean water storage tank 312 or drawn as clean water. Water that is intended for drinking may optionally be passed through an activated carbon filter 314 before it is delivered to a tap 316. As will be appreciated by those familiar with the art, carbon filters are well suited for removing a variety of contaminants that may remain even in highly filtered water.

Water that is discharged from the effluent outlet 136 may follow either: path 319 where it is recirculated back to pump 301 where it is pumped back into the hydroclone; or path 321 where it is passed to a drain 323. Flow adjustment valves 325 are provided in each effluent outflow path so that their relative flowrates can readily be adjusted. As described earlier, it is generally desirable to run the hydroclone 305 in conditions where a significant percentage (e.g. 25-75%) of the influent flowstream exits the hydroclone 305 through the effluent outlet 136. This is important in order to maintain high quality vortex within the hydroclone while obtaining reasonable clean water throughputs. In some applications, it will be desirable to discharge the entire effluent stream from the system 300. However, more typically, it will be desirable to recover a higher percentage of the influent stream. This can readily be accomplished by recirculating the effluent stream via flow path 319 back to the hydroclone 305. The hydroclone can be operated in a continuous recycling/drain mode by adjusting the relative portions of the effluent stream that are recirculated verses passed to the drain.

By way of example, consider a filtration system 300 that operates the hydroclone 305 in a condition where half the influent stream 326 is passed through the filter into clean water stream 327 and the other half of the influent stream exits through the effluent outlet as stream 329. The effluent outlet stream 329 may be split such that 20% of the effluent outlet stream is passed to the drain 323 through path 321 and 80% of the effluent outlet stream is recirculated through path 319. If such a system is operated in a state such that the inlet stream 331 flows at 60 gallons per minute, it would discharge 50 gallons per minute of clean water and would pass 10 gallons per minute of water to the drain. Thus, it would pass $5/6^{ths}$ of the overall inlet stream 331 as filtered water to the clean water stream 327 and would pass only $1/6^{th}$ of the overall inlet stream to the drain resulting in an overall recovery of approximately 83 percent of the inlet stream. Of course, the relative flowrates of the clean water stream 327, the effluent outlet stream 329, the recirculating stream 319 and the drain stream 321 can readily be adjusted to provide higher or lower inlet stream 331 recovery rates. In many applications, it will be desirable to operate at higher recovery rates, as for example, at 90%, or 95% or greater.

In other applications, the system can be operated in a periodic purge mode rather than the continuous recycling/drain mode described above. In this mode, all of the effluent outlet stream 329 is recirculated to the pump via recirculating stream 319. The hydroclone is then periodically purged in order to discharge the concentrated particles that accumulate due to the recycling. It should be appreciated that in the periodic purge mode, the suspended particle concentration within the hydroclone chamber 110 will continue to increase during operation until the hydroclone is purged. The frequency at which the hydroclone will need to be purged in order to operate most efficiently will vary significantly based on the relative cleanliness of the inlet stream 331. Generally, higher clean water recovery rates can be obtained by running the hydroclone in the periodic purge mode.

In the embodiment illustrated in FIG. 13, a purge valve 336 is plumbed in parallel to the drain flow adjustment valve 325 in the drain stream 321. The purge valve 336 may be opened when the hydroclone is purged. Of course, in other embodiments, a single valve may be used in place of the two parallel valves in the drain stream 321.

As described above, it is also necessary to periodically flush the filter and/or otherwise allow particles that have accumulated on the filter surface to fall away from the filter surface. In order to facilitate the assertion of a backpressure to the filter, a shutoff valve 340 may be plumbed into the clean water conduit 327 between the hydroclone 305 and the first fine filter 307. In order to facilitate flushing the filter, a purge tank 338 may be coupled to the clean water conduit 327 as well. In the illustrated embodiment, the purge tank 338 is pressurized by a flushing pump 339. The flushing pump 339 draws from an appropriate clean water source, such as storage tank 312. When the filter is to be flushed, a flushing valve 341 opens to couple the purge tank 338 to the clean water conduit 327. At the same time, the purge valve 336 in the drain stream 321 is preferably opened to allow the hydroclone to be purged at the same time the filter is flushed.

In the mode of operation just described, the hydroclone is purged at the same time the filter is flushed. Such an arrangement works well. However, this is not a requirement and either purging or flushing may be performed independently if desired.

In the illustrated embodiment, the purge tank 338 is pressurized by a separate flushing pump 339. In some alternative embodiments, the purge tank 338 may be pressurized by the normal flow in clean water conduit 327 and the flushing valve 341 may be eliminated. In this embodiment, if the hydroclone is temporarily stopped, the purge tank will apply a back pressure to the filter thereby flushing the filter.

In any of the embodiments, a hand pump 343 may optionally be plumbed to communicate with the clean water conduit 327 and the purge tank 338. The hand pump provides a mechanism for priming the purge tank. The hand pump draws from an appropriate clean water source, such as storage tank 312.

A controller 350 is provided to operate pump 301 and the valves that are necessary to operate the hydroclone 305 and any other components of the water purification system 300 that require active control (such as the bacterial control unit 310). A differential pressure switch 352 is arranged to measure the pressure drop across the hydroclone and provide such information to the controller 350. As discussed earlier, the pressure drop across the hydroclone filter is indicative of how blocked the filter has become and this information can be used by the controller 350 to determine when a backpressure should be applied to the filter and/or the hydroclone should be flushed. Of course, the frequency with which the filter will need to be flushed will vary significantly with the relative cleanliness of the influent stream 326, which in turn will depend in part on the cleanliness of the inlet stream 331 and the amount of effluent recycling that is chosen. When relatively dirty water—such as typical river water is used as the water source, flushing may be necessary relatively frequently, as for example every 30 seconds. However if much cleaner water is used as the source 303, then the flushing may be required much less frequently.

Pressure gauges 354 may be provided between components of the water purification system to facilitate monitoring of the system. If desired, the controller can be arranged to monitor these pressure gauges as well in order to permit automatic monitoring of the system.

Although only a few embodiments of the invention have been described in detail, it should be appreciated that the invention may be implemented in many other forms without departing from the spirit or scope of the invention. For example, although a few specific applications have been described, the hydroclones may be used in a wide variety of other filtering applications. Additionally, there are some applications where it is desirable to concentrate particles that are suspended within water (or other fluids) in order to recover the particles. A hydroclone that has been plumbed for recirculation of the effluent stream is particularly well adapted for use in such concentrating applications, particularly when the hydroclone is operated in the periodic purge mode. In these applications, it may be the concentrated purged fluids that contains the effluent of interest.

Although specific components of the hydroclone such as specific filters, cleaning assemblies, and intake structures have been described, it should be appreciated that the various devices may be used in combination or together with other suitable components without departing from the spirit of the present inventions. Therefore, the present embodiments are to be considered as illustrative and not restrictive and the invention is not to be limited to the details given herein, but may be modified within the scope and equivalents of the appended claims.

What is claimed is:

1. A hydroclone comprising:
    a tank having an internal chamber defining a central axis, a fluid inlet, a filtered fluid outlet and an effluent outlet and a filter positioned within the internal chamber of the tank that defines a filtered fluid chamber within the internal chamber of the tank,
    wherein the filter has a run portion comprising a run face extending substantially perpendicular to the central axis, and a rise portion comprising a rise face extending substantially parallel to the central axis wherein the rise portion comprises a multiplicity of pores arranged to permit fluid to flow substantially radially into the filtered fluid chamber from outside the filtered fluid chamber, wherein the pores are formed as elongated slits in the external surface of the filter,
    wherein the fluid inlet is arranged such that fluid entering the chamber through the fluid inlet flows into a region between the chamber wall and the filter,
    the filtered fluid outlet is arranged to discharge filtered fluid that has passed through the filter,
    the effluent outlet is arranged to discharge a concentrated effluent that has generally not passed through the filter, and
    the hydroclone is arranged such that during operation a vortex of flowing liquid is formed between the chamber wall and the filter with the filter located substantially in the center of the vortex and such that the filter acts as a cross-flow filter with the flowing liquid transversely crossing the elongated slits.

2. A hydroclone as recited in claim 1 wherein the filter has a substantially frusto-conically shaped working region and the filtered fluid outlet is arranged to draw filtered fluid from a narrow end of the frusto-conically shaped working region.

3. A hydroclone as recited in claim 1 wherein the filter has a generally tapered working region and the filtered fluid outlet is arranged to draw filtered fluid from a narrow end of the tapered working region.

4. A hydroclone as recited in claim 1 further comprising:
    a circulating cleaning assembly positioned in a hydroclone region defined between the chamber wall and the filter, wherein the circulating cleaning assembly is arranged to help clean the filter.

5. A fluid treatment system as recited in claim 1 wherein the slits have a width that is less than approximately 50 microns.

6. A fluid treatment system as recited in claim 1 wherein the slits have a width that is less than approximately 10 microns.

7. A fluid treatment system as recited in claim 1 wherein the slits have a width that is less than approximately 2 microns.

8. A fluid treatment system as recited in claim 1 wherein the elongated slits are oriented substantially vertically and in parallel with the central axis such that the elongated slits extend substantially perpendicular to fluid flowing in the vortex.

9. A fluid treatment system as recited in claim 1 wherein the surface filter is a stacked disc filter.

10. A hydroclone comprising:
a tank having an internal chamber, a fluid inlet, a filtered fluid outlet and an effluent outlet;
a filter positioned within the internal chamber of the tank that defines a filtered fluid chamber within the internal chamber of the tank, the filter having a multiplicity of pores that are arranged to permit fluid to flow substantially radially into the filtered fluid chamber from outside the filtered fluid chamber, wherein the pores are formed as elongated slits in the external surface of the filter and the filter has a generally tapered working region and the filtered fluid outlet is arranged to draw filtered fluid from a narrow end of the tapered working region, wherein,
(i) the tapered working region of the filter has a series of stages that help reduce the size of eddies and countercurrents that occur along a face of the filter during operation of the hydroclone, and
(ii) the stages take the form of a series of steps, each step having a rise portion that has a rise face that extends substantially in parallel to a central axis of the internal chamber and a run portion that has a run face that extends transversely relative to the central axis of the internal chamber, and
(ii) the rise portion of each step include a multiplicity of associated pores that permit fluid to flow into the filtered fluid chamber, and
(iv) the run portion of each step is arranged such that fluid can not pass into the filtered fluid chamber through the run portion of any step; and
wherein the fluid inlet is arranged such that fluid entering the chamber through the fluid inlet flows into a region between the chamber wall and the filter,
the filtered fluid outlet is arranged to discharge filtered fluid that has passed through the filter,
the effluent outlet is arranged to discharge a concentrated effluent that has generally not passed through the filter, and
the hydroclone is arranged such that during operation a vortex of flowing liquid is formed between the chamber wall and the filter with the filter located substantially in the center of the vortex and such that the filter acts as a cross-flow filter with the flowing liquid transversely crossing the elongated slits.

11. A hydroclone comprising:
a tank having an internal chamber, a fluid inlet, a filtered fluid outlet and an effluent outlet;
a filter positioned within the internal chamber of the tank that defines a filtered fluid chamber within the internal chamber of the tank, the filter having a multiplicity of pores that are arranged to permit fluid to flow substantially radially into the filtered fluid chamber from outside the filtered fluid chamber, wherein the pores are formed as elongated slits in the external surface of the filter, and the filter has a rise portion that has a rise face that extends substantially in parallel to a central axis of the internal chamber and a run portion that has a run face that extends substantially perpendicularly relative to the central axis of the internal chamber and the multiplicity of pores are located on the rise face; and
wherein the fluid inlet is arranged such that fluid entering the chamber through the fluid inlet flows into a region between the chamber wall and the filter,
the filtered fluid outlet is arranged to discharge filtered fluid that has passed through the filter,
the effluent outlet is arranged to discharge a concentrated effluent that has generally not passed through the filter, and
the hydroclone is arranged such that during operation liquid flows is formed between the chamber wall and the filter such that the filter acts as a cross-flow filter with the flowing liquid transversely crossing the elongated slits.

12. A hydroclone as recited in claim 11 wherein the filter is arranged such that fluid can not pass into the filtered fluid chamber through the run portion.

13. A hydroclone as recited in claim 11 wherein all of the filtered fluid entering the filtered fluid chamber passes substantially radially through the filter.

14. A fluid treatment system as recited in claim 11 wherein the slits have a width that is less than approximately 20 microns.

15. A fluid treatment system as recited in claim 11 wherein the slits have a width that is less than approximately 5 microns.

16. A fluid treatment system as recited in claim 11 wherein the surface filter is an electroformed metal surface filter.

17. A fluid treatment system as recited in claim 11 wherein the pores are tapered such that they are narrowest at a first surface of the filter facing the vortex and widest at a second surface of the filter facing the filtered fluid chamber.

18. A hydroclone comprising:
a tank having an internal chamber having a chamber wall, a fluid inlet, a filtered fluid outlet and an effluent outlet, wherein a diameter of the internal chamber is larger near the fluid inlet than at the effluent outlet; and
a surface filter positioned within the internal chamber of the tank, the surface filter having a multiplicity of slot shaped pores formed therein that have a width of approximately 50 microns or less, the surface filter further defining a filtered fluid chamber within the internal chamber of the tank, wherein the filter has a rise portion that has a rise face that extends substantially in parallel to a central axis of the internal chamber and a run portion that has a run face that extends substantially perpendicularly relative to the central axis of the internal chamber, and the multiplicity of pores are located on the rise face; and
wherein the fluid inlet is arranged such that fluid entering the chamber through the fluid inlet flows into a region between the chamber wall and the filter, the filtered fluid outlet is arranged to discharge filtered fluid from the filtered fluid chamber that has passed through the filter, the effluent outlet is arranged to discharge a concentrated effluent that has generally not passed through the filter, and
wherein the hydroclone is arranged such that during operation a vortex of flowing fluid is formed between the chamber wall and the filter with the filter located in the center of the vortex and such that the filter acts as a cross-flow filter and the filter slots are oriented substantially perpendicular to the flow path of fluid flowing in the adjacent portion of the vortex.

19. A hydroclone as recited in claim 18 further comprising:
an intake structure arranged to introduce an influent stream entering through the fluid inlet tangentially into the internal chamber, the intake structure includes a central region and an annular descending fluid intake ramp that surrounds the central region and gradually directs the influent stream downward in its first rotation within the fluid chamber.

20. A hydroclone as recited in claim 19 wherein the intake ramp descends in the range of 25-75 percent of the height of the influent stream.

21. A hydroclone as recited in claim 19 wherein the intake ramp includes:
a primary channel arranged to receive the influent stream that is narrower than a full width the intake ramp, the primary channel including a tapered region that gradually widens to the full width of the intake ramp; and
a secondary channel adjacent the primary channel in the region between the fluid inlet and a convergence point where the width of the primary channel is the same as the width of the intake ramp.

22. A hydroclone as recited in claim 21 wherein the intake ramp descends at a substantially constant rate from the convergence point to the fluid inlet.

23. A hydroclone as recited in claim 21 wherein the intake ramp has a substantially constant width.

24. A hydroclone as recited in claim 18 wherein the slots have a width and a length that is substantially longer than the slot width and the vortex is arranged to flow transversely across the width of the slots.

25. A hydroclone as recited in claim 24 wherein the slots have a width that is no greater than approximately 20 microns.

26. A hydroclone as recited in claim 25 wherein the slots have a width that is no greater than approximately 10 microns.

27. A hydroclone as recited in claim 26 wherein the slots have a width that is no greater than approximately 5 microns.

28. A hydroclone as recited in claim 27 wherein the slots have a width that is no greater than approximately 2 microns.

29. A hydroclone as recited in claim 18 wherein the elongated slots are oriented substantially vertically and in parallel with the central axis such that the elongated slots extend substantially perpendicular to fluid flowing in the vortex.

30. A hydroclone as recited in claim 18 wherein the surface filter is an electroformed metal surface filter.

31. A hydroclone as recited in claim 18 wherein the pores extend substantially radially such that fluid flowing through the filter passes substantially radially through the filter.

32. A hydroclone as recited in claim 31 wherein the pores are radially tapered such that they are narrowest at a first surface of the filter facing the vortex and widest at a second surface of the filter facing the filtered fluid chamber.

* * * * *